United States Patent
Eakin et al.

(10) Patent No.: US 11,211,058 B1
(45) Date of Patent: Dec. 28, 2021

(54) DISAMBIGUATION IN AUTOMATIC SPEECH PROCESSING

(71) Applicant: Amazon Technologies, Inc., Seattle, WA (US)

(72) Inventors: Aaron Eakin, Seattle, WA (US); Angela Sun, Seattle, WA (US); Ankur Gandhe, Bothell, WA (US); Ariya Rastrow, Seattle, WA (US); Chenlei Guo, Redmond, WA (US); Xing Fan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 16/577,394

(22) Filed: Sep. 20, 2019

(51) Int. Cl.
*G10L 15/197* (2013.01)
*G10L 15/30* (2013.01)
*G10L 15/22* (2006.01)

(52) U.S. Cl.
CPC ............ *G10L 15/197* (2013.01); *G10L 15/22* (2013.01); *G10L 15/30* (2013.01); *G10L 2015/223* (2013.01)

(58) Field of Classification Search
USPC .................... 704/246, 247, 251, 252, 257
See application file for complete search history.

(56) References Cited

U.S. PATENT DOCUMENTS

| | | | | |
|---|---|---|---|---|
| 9,786,273 | B2* | 10/2017 | Longe | G10L 15/18 |
| 10,572,810 | B2* | 2/2020 | Khan | G06F 3/167 |
| 2011/0029312 | A1* | 2/2011 | Braho | G10L 15/01 |
| | | | | 704/243 |
| 2012/0245939 | A1* | 9/2012 | Braho | G10L 15/22 |
| | | | | 704/243 |
| 2014/0288933 | A1* | 9/2014 | Braho | G10L 15/08 |
| | | | | 704/251 |
| 2016/0133253 | A1* | 5/2016 | Braho | G10L 15/065 |
| | | | | 704/251 |
| 2018/0309866 | A1* | 10/2018 | Devaraj | H04M 1/72433 |
| 2018/0314689 | A1* | 11/2018 | Wang | G10L 15/22 |
| 2019/0035385 | A1* | 1/2019 | Lawson | G10L 15/063 |
| 2019/0035386 | A1* | 1/2019 | Leeb | G10L 15/063 |

* cited by examiner

*Primary Examiner* — Leonard Saint Cyr
(74) *Attorney, Agent, or Firm* — Pierce Atwood LLP

(57) ABSTRACT

Described herein is a system for prompting a user for clarification when an automatic speech recognition (ASR) system encounters ambiguity with respect to the user's input. The feedback provided by the user is used to retrain machine-learning models and/or to generate new machine-learning models. Based on the type of ambiguity, the system may determine to retrain one or more ASR models that are widely used by the system or to generate/update one or more user-specific models that are used to process inputs from one or more particular users.

20 Claims, 13 Drawing Sheets

DISAMBIGUATION IN AUTOMATIC SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
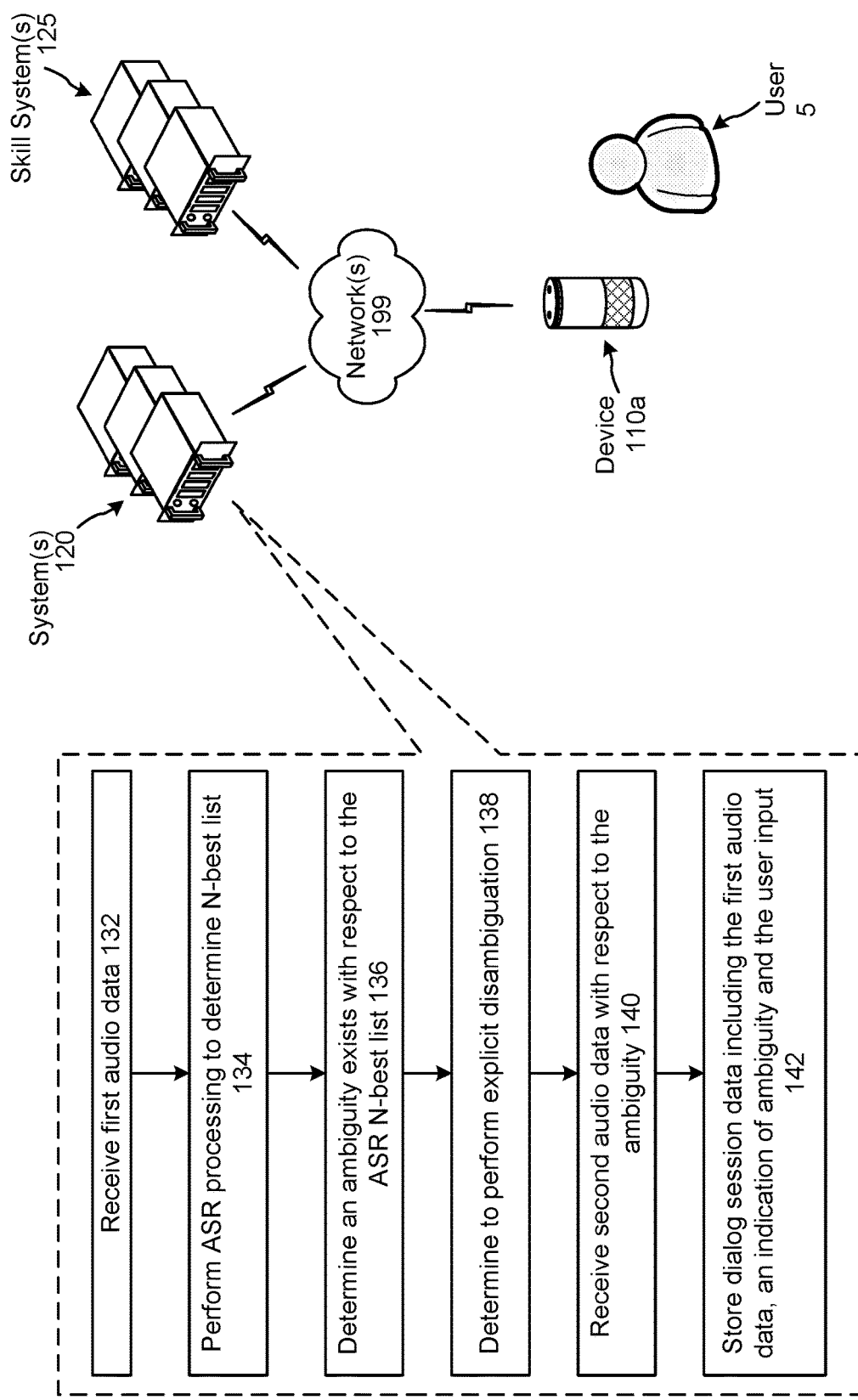
FIG. 1A illustrates a system configured to perform disambiguation with respect to user input according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may include multiple applications and/or skills that are capable of performing particular actions. The system may identify an appropriate application or skill to perform a particular action. For example, a skill system corresponding to Spotify and a skill system corresponding to Pandora are both capable of playing music. The system may choose one of these skill systems to play music based on various factors.

A system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input.

One potential failure point for a speech processing system occurs when an error in ASR processing propagates into downstream components such as the NLU, resulting in further errors. For example, a user may request the weather in Boston, but the system instead outputs the weather in Austin because the ASR processing determined that the user said "Austin" (which sounds similar to Boston).

The present system realizes that there is some ambiguity in determining what the user said, and in a patentable improvement, asks the user for clarification (e.g., "did you say Boston, Mass. or Austin, Tex.?"). The user may provide feedback clarifying the initial user request, which may enable the system to respond to the user's request successfully with the appropriate response. The present system determines when to request the user for clarification (for example, perform explicit disambiguation). The present system also learns from the clarification feedback received from the user. The present system may determine how often and how many users experience similar ambiguities (for example, confusion between Boston and Austin), and how to learn from the feedback, for example, by retraining widely-used machine learning models or to generate user-specific machine learning models for speech processing.

The present system may provide a more desirable user experience. This is due, at least in part, to the fact that the present disclosure's teachings decrease a frequency at which unresponsive actions are performed by a system. By decreasing the instances of such actions being performed, user/system interactions may be improved.

Figure 1B:
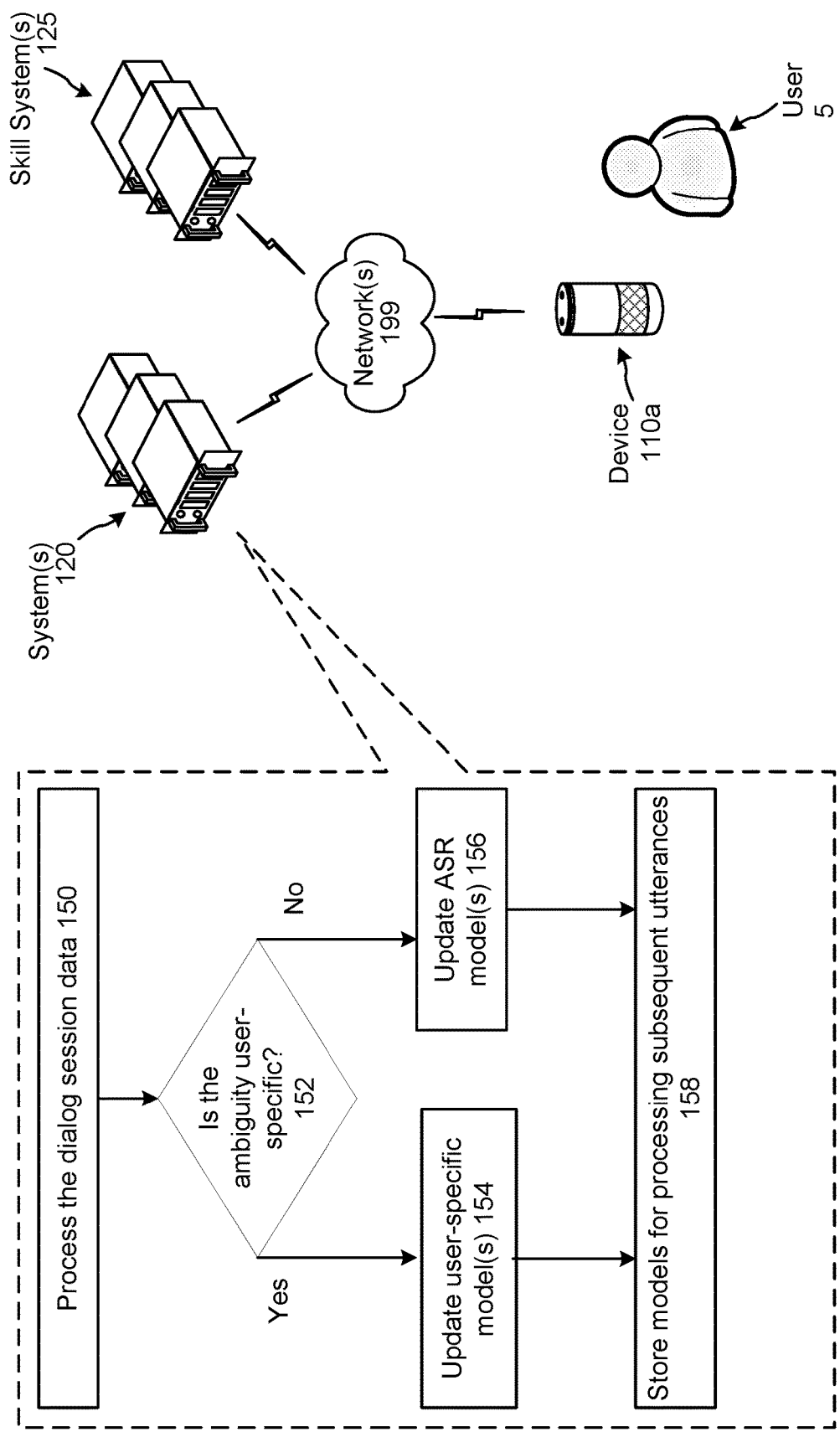
FIG. 1B illustrates a system configured to update the system using user feedback according to embodiments of the present disclosure.

FIG. 1A illustrates a system configured to perform disambiguation with respect to user input according to embodiments of the present disclosure. FIG. 1B illustrates a system configured to update the system using user feedback according to embodiments of the present disclosure. As illustrated in FIGS. 1A and 1B, the system may include a device 110a local to a user 5, one or more systems 120, and one or more skill systems 125 connected across one or more networks 199.

Referring to FIG. 1A, the system(s) 120 may receive (132) first audio data representing an utterance. The first audio data may represent a first utterance (initial user request) spoken by the user 5 and captured by the device 110a. The system(s) 120 may perform ASR processing using the first audio data to determine an ASR N-best list including multiple ASR hypotheses representing text data corresponding to the utterance. Details on how the system performs ASR processing are described below. The system(s) 120 may associate a dialog session identifier (ID) with the first audio data.

The system(s) 120 may determine (136) an ambiguity exists with respect to the ASR N-best list. For example, a first score corresponding to the top hypothesis (1-best) in the N-best list may not exceed a threshold, indicating that the system may have low confidence in what the first audio data represents. In another example, the first score and a second score corresponding to another hypothesis (e.g., 2-best) in the N-best list may be within a threshold range of each other, indicating that there is high likelihood that the first audio data may be represented by either of the hypotheses. Such ambiguity may be caused when the utterance includes a word that may sound similar to one or more other words, or may be caused by the way the user speaks (e.g., accents, pronunciations, intonations, etc.). The system(s) 120 may associate the dialog session ID with the N-best list corresponding to the first audio data.

The system(s) may determine (138) to perform explicit disambiguation, for example, by requesting the user for clarification with respect to the ambiguity. In an example embodiment, the system(s) 120 may determine that the ambiguity relates to slot values, rather than the user's intent. As described below, a user's request may be processed using NLU to determine the user's intent (e.g., play music, hear the weather, etc.). NLU processing may also determine slot values that can be used to perform the user's request. For example, for a user's request to play music, the request may also include a song name and/or an artist name, and the request to hear the weather may include the name of a city. The names of the song, the artist and the city are referred to herein as slot values. The system(s) 120 may determine to perform explicit disambiguation if the ambiguity relates to slot values.

The system(s) 120 may also determine a type of disambiguation to perform. For example, the system(s) 120 may request the user to select between two slot values, or to confirm one slot value. When the scores corresponding to the ASR hypotheses representing two slot values (or entities) are within a threshold range of each other (e.g., slot values "Boston" has a score of 30 and "Austin" has a score of 25), then the system(s) 120 may determine to ask the user to select between the two slot values. The system(s) may generate the following output audio data (using TTS processing as described below): "Do you mean Boston or Austin?" When the first score for the top ASR hypothesis is below a threshold and the second score for the next ASR hypothesis is not within range of the first score (e.g., slot values "Boston" has a score of 20 and "Austin" has a score of 5), the system(s) 120 may determine to confirm the slot value corresponding to the top ASR hypothesis. The system(s) 120 may generate the following output audio data: "Did you say Boston?"

The output audio data may be sent to the device 110a for output to the user. The system(s) 120 may receive (140) second audio data representing a second utterance. The second utterance may be a response (user feedback) by the user 5 to the clarification request from the system. The system(s) 120 may perform ASR processing and NLU processing using the second audio data. For example, the system(s) 120 may determine that the user selected one of the slot values presented in the clarification request or confirmed the slot value in the clarification request. The system(s) 120 may associate the dialog session ID with the second audio data.

The system(s) 120 may store (142) dialog session data including at least the first audio data representing the user's initial request, the second audio data representing the user's feedback/clarification with respect to the initial request, and an indication that an ambiguity existed with respect to the initial user request.

Referring to FIG. 1B, the system(s) 120 may process (150) the dialog session data to determine how the system can learn from the disambiguation. The system(s) 120 may process the dialog session data to determine how many users of the system encountered a similar ambiguity. For example, the system(s) 120 may analyze other dialog session data, having an indication of ambiguity, associated with other user profiles to determine if the ambiguities related to the same slot values. The system(s) 120 may determine (152) if the ambiguity corresponding to the dialog session data is user-specific that is experienced by the user 5 or a particular group of users. For example, the system(s) 120 may determine if a group of users within a geographic location experienced the similar ambiguities using dialog session data associated with the user profiles within a geographic location. The system(s) 120 may determine that the ambiguity is not related to a particular type of user, and instead is experienced by a wide range of users. For example, the system(s) 120 may determine, using the corresponding dialog session data, that multiple user profiles experienced a similar ambiguity. The system(s) 120 may determine that the user profiles do not have one or more common factors (e.g., a particular a geographic region, a particular device type, or other information) to indicate that the ambiguity relates to a particular group of users.

If the ambiguity is user-specific, then the system(s) 120 may update (154) or generate one or more user-specific machine-learning model(s). The user-specific model(s) may be associated with the user profile corresponding to the user 5. If the system(s) 120 determines that the ambiguity is experienced by a group of users, then the updated/generated user-specific model(s) may also be associated with the user profiles of the user in the group. If the ambiguity is not user-specific and is experienced by a large number of users of the system, then the system(s) 120 may update (156) one or more ASR machine learning model(s) of the system(s) 120. The ASR model(s) may be widely used by the system(s) 120 to process user input from various users. Further details of how the system determines if the ambiguity is user-specific and how the system is updated are described in relation to FIG. 7.

The system(s) 120 may store (158) the user-specific model(s) and the updated ASR model(s) for processing subsequent utterances. The system(s) 120 may perform ASR processing using the updated ASR model(s) and the user-specific model(s) associated with a user profile to generate ASR results with higher confidence.

In some embodiments, learning from the disambiguation may occur in real-time, that is, within minutes of the system responding to the user's initial request.

As used herein, a "dialog," "dialog session," "dialog session data" or the like refers to various related user inputs and system outputs, for example inputs and outputs related to an ongoing exchange between a user and the system, and includes ASR and/or NLU data corresponding to the user inputs.

Figure 2A:
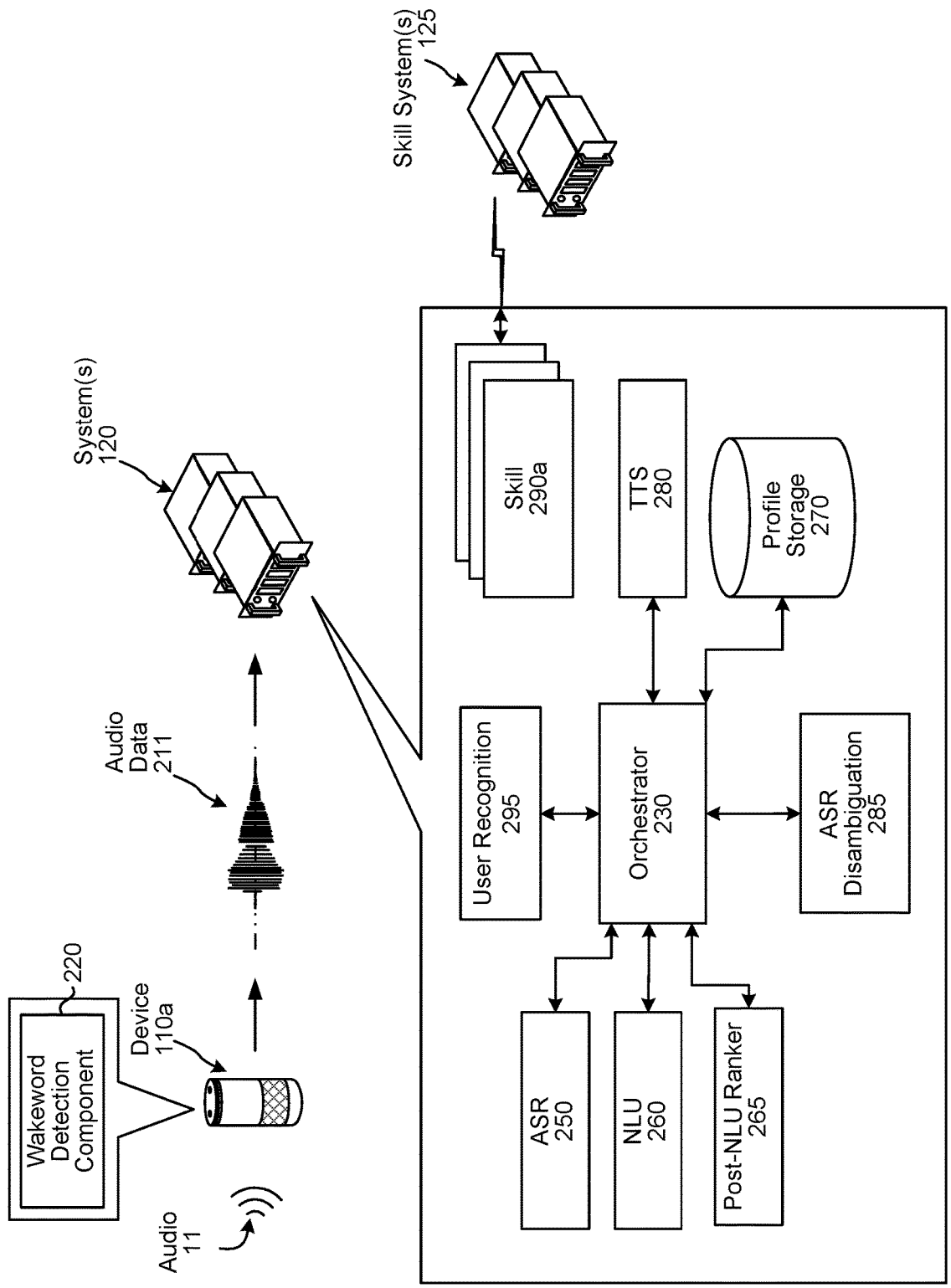
FIG. 2A is a conceptual diagram of components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The orchestrator component 230 may send text data (e.g., text data output by the ASR component 250) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to a skill, skill device, skill component, or the like herein may include a skill 290 operated by the system(s) 120 and/or skill operated by the skill system(s) 125. Moreover, the functionality described herein as a skill may be referred to using many different terms, such as an action, bot, app, or the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2B:
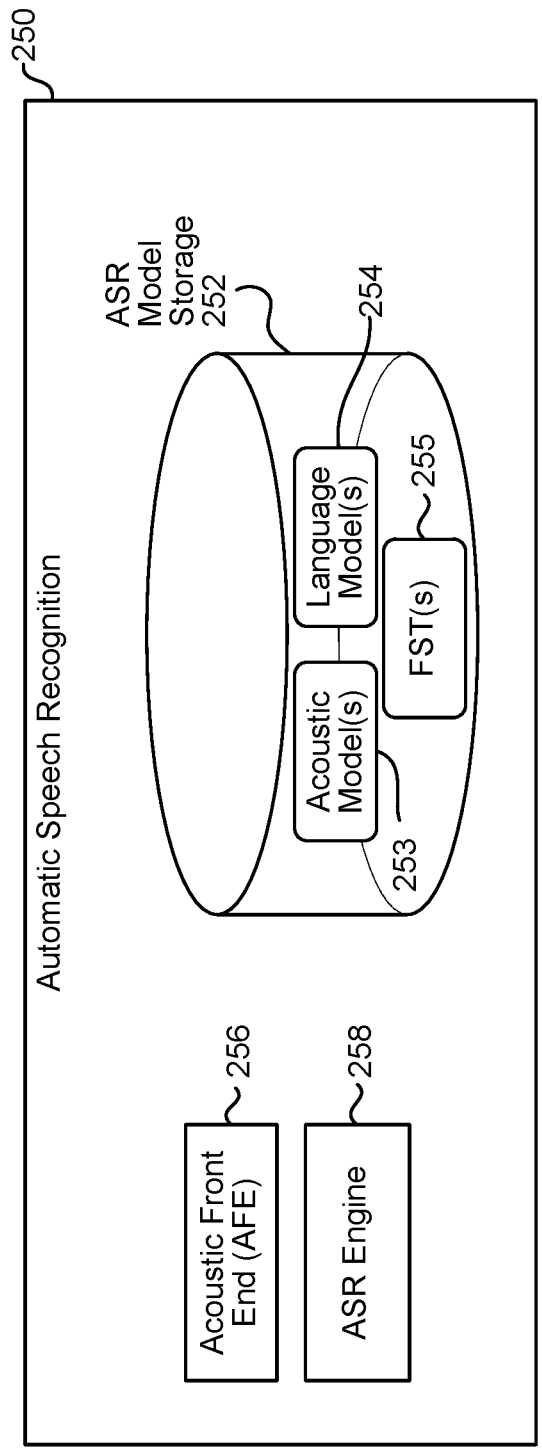
FIG. 2B is a conceptual diagram of automatic speech recognition components of the system according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may also include an ASR disambiguation component 285. The ASR disambiguation component 285 may be configured to process multiple ASR hypotheses to determine a potential ambiguity (where the system is not confident about what the user said), determine an alternative ASR hypothesis(es), and determine whether to perform explicit disambiguation by requesting clarification from the user with respect to the user input. The ASR hypotheses processed by the ASR disambiguation component 285 may be generated by the ASR component 250, as described above, and may include text data, vector data, feature vector data, and the other forms of data corresponding to an utterance. The ASR disambiguation component 285 may also process other data, generated by the ASR component 250, corresponding to ASR hypotheses, such as an ASR score, an ASR confidence level, a token-level score, or other data indicating a probability/likelihood/confidence level of the system relating to the ASR hypotheses. The ASR disambiguation component 285 may also be configured to retrain an ASR machine-learning model(s) or to retrain or generate a user-specific machine-learning model(s) using the dialog session data and the clarification feedback received from the user. The ASR disambiguation component 285 may be configured to determine how one or more models (including user-specific models) used for ASR processing by the ASR component 250 can be retrained, updated and/or generated.

Figure 3:
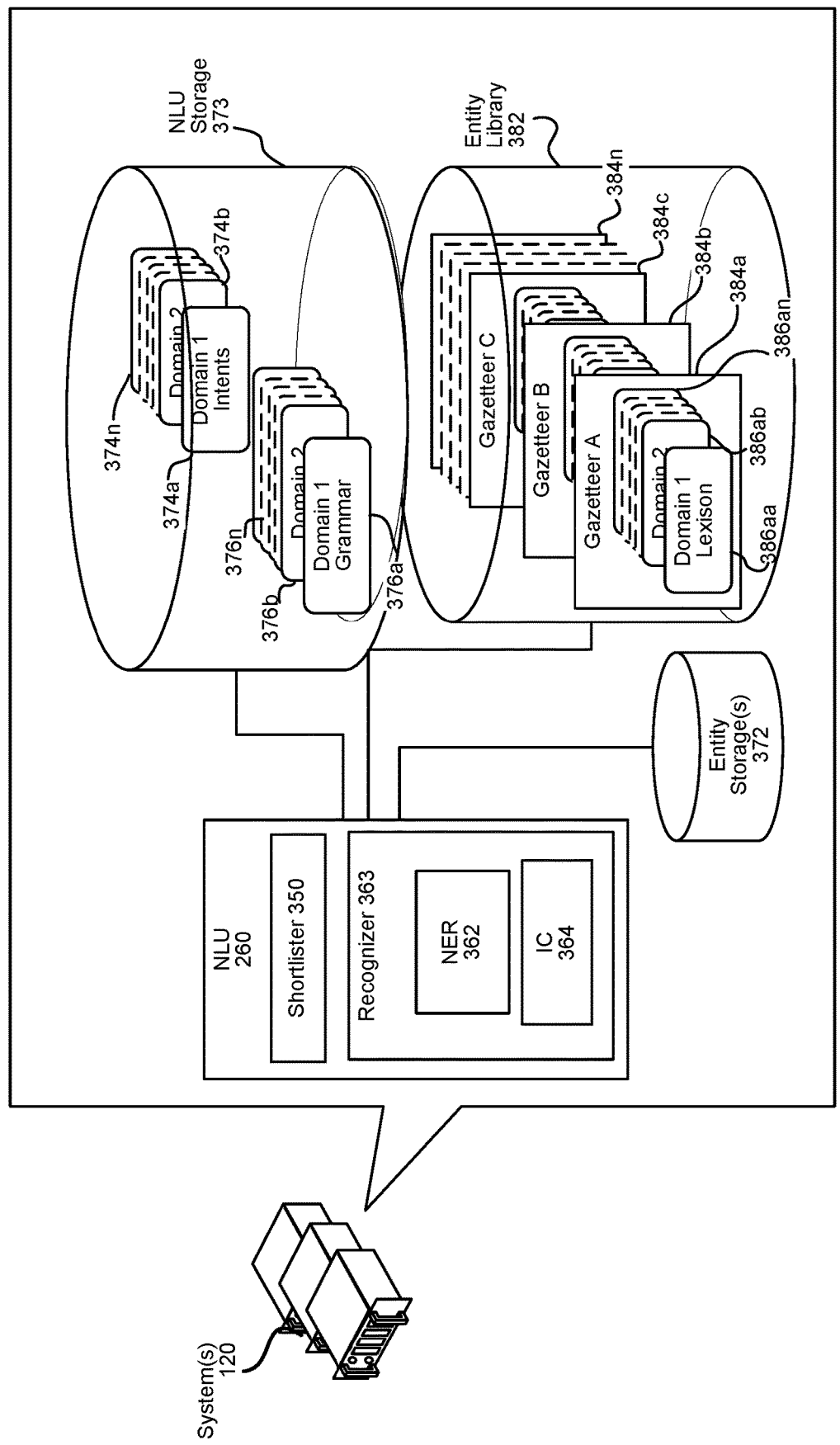
FIG. 3 is a conceptual diagram illustrating how NLU processing may be performed according to embodiments of the present disclosure.

FIG. 3 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an<OutputWeather>intent as well as separately tag "Seattle" as a location for the weather information.

The NLU component 260 may include a shortlister component 350. The shortlister component 350 selects skills that may execute with respect to an ASR hypothesis represented as text data 410 input to the NLU component 260 (e.g., applications that may execute with respect to the user input). The shortlister component 350 thus limits downstream, more resource intensive NLU processes to being performed with respect to skills that may execute with respect to the user input.

Without a shortlister component 350, the NLU component 260 may process text data 410 input thereto with respect to every skill of the system, either in parallel, in series, or using some combination thereof. By implementing a shortlister component 350, the NLU component 260 may process text data 410 with respect to only the skills that may execute with respect to the user input. This reduces total compute power and latency attributed to NLU processing.

The shortlister component 350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the text data 410 may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

Training the shortlister component 350 may require establishing a "ground truth" for the training examples input therein. The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. Each recognizer 363 may be associated with a different domain (e.g., smart home, video, music, weather, custom, etc.).

If the shortlister component 350 determines text data 410 is potentially associated with multiple domains, the recognizers 363 associated with the domains may process the text data 410, while recognizers 363 not indicated in the shortlister component 350's output may not process the text data 410. The "shortlisted" recognizers 363 may process the text data 410 in parallel, in series, partially in parallel, etc. For example, if text data 410 potentially relates to both a communications domain and a music domain, a recognizer associated with the communications domain may process the text data 410 in parallel, or partially in parallel, with a recognizer associated with the music domain processing the text data 410.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity associated with a domain, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora, or the like.

Each recognizer 363, and more specifically each NER component 362, may be associated with a particular grammar database 376, a particular set of intents/actions 374, and a particular personalized lexicon 386. Each gazetteer 384 may include domain-indexed lexical information associated with a particular user and/or device 110. For example, a Gazetteer A (384a) includes domain-indexed lexical information 386aa to 386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information 376 and lexical information 386 associated with a domain (associated with the recognizer 363 implementing the NER component 362) to determine a mention of one or more entities in text data. In this manner, the NER component 362 identifies "slots" (each corresponding to one or more particular words in text data) that may be useful for later processing. The NER component 362 may also label each slot with a type (e.g., noun, place, city, artist name, song name, etc.).

Each grammar database 376 includes the names of entities (i.e., nouns) commonly found in speech about the particular domain to which the grammar database 376 relates, whereas the lexical information 386 is personalized to the user and/or the device 110 from which the user input originated. For example, a grammar database 376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (384a-384n) stored in an entity library storage 382. The gazetteer information 384 may be used to match text data (representing a portion of the user input) with text data representing known entities, such as song titles, contact names, etc. Gazetteers 384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 363 may also include an intent classification (IC) component 364. An IC component 364 parses text data to determine an intent(s) (associated with the domain associated with the recognizer 363 implementing the IC component 364) that potentially represents the user input. An intent represents to an action a user desires be performed. An IC component 364 may communicate with a database 374 of words linked to intents. For example, a music intent database may link words and phrases such as "quiet," "volume off," and "mute" to a<Mute>intent. An IC component 364 identifies potential intents by comparing words and phrases in text data (representing at least a portion of the user input) to the words and phrases in an intents database 374 (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a<PlayMusic>intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364

(implemented by the same recognizer 363 as the NER component 362) may use the identified verb to identify an intent. The NER component 362 may then determine a grammar model 276 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a<PlayMusic>intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the text data.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

Figure 4:
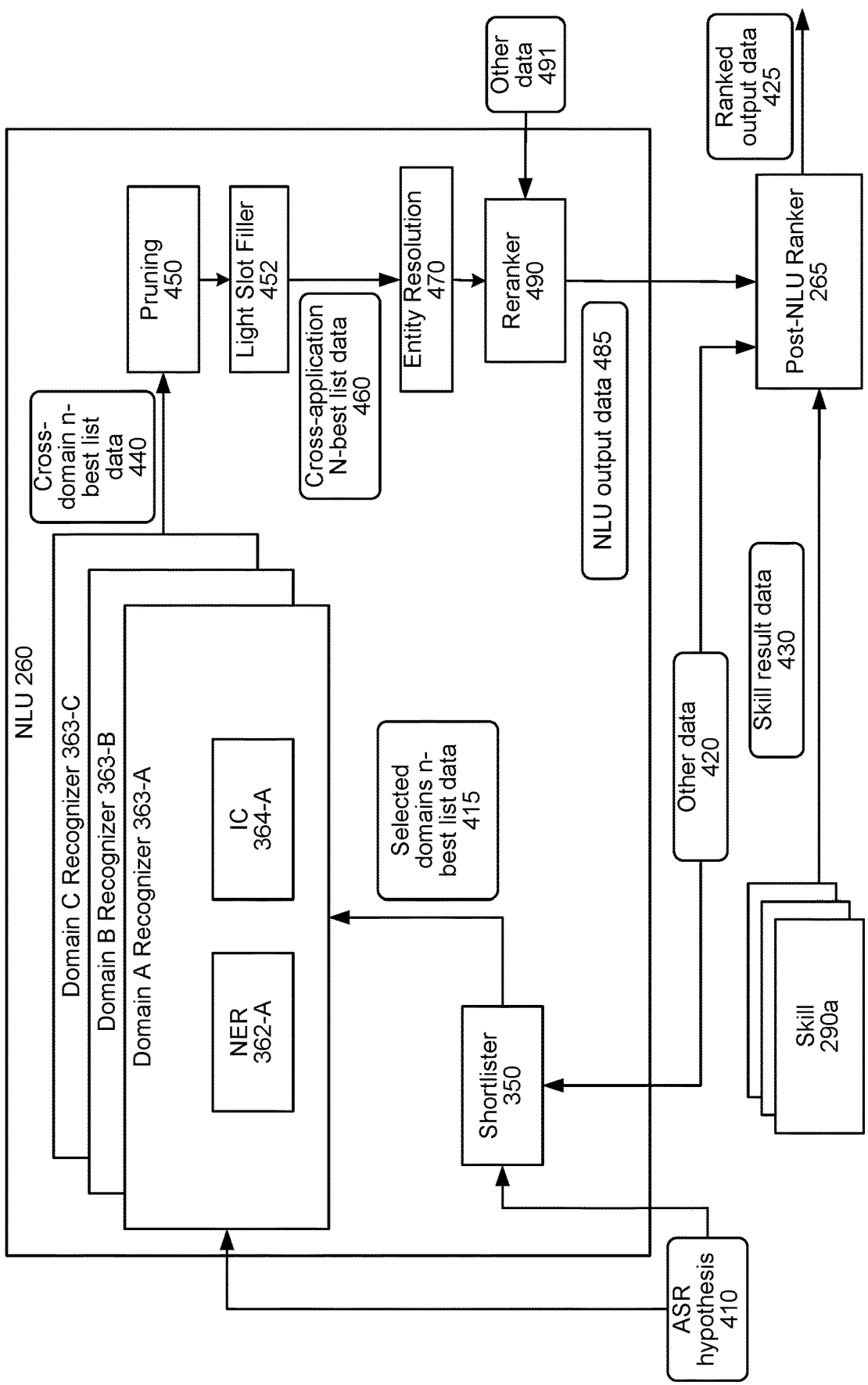
FIG. 4 is a conceptual diagram illustrating how NLU processing may be performed according to embodiments of the present disclosure.

The shortlister component 350 may receive text data 410 output from the ASR component 250 or output from the device 110b (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 450 to operate on the text data 410. For example, an embedding of the text data 410 may be a vector representation of the text data 410.

The shortlister component 350 may make binary determinations (e.g., yes or no) regarding which domains relate to the text data 410. The shortlister component 350 may make such determinations using the one or more trained models described herein above. If the shortlister component 350 implements a single trained model for each domain, the shortlister component 350 may simply run the models that are associated with enabled domains as indicated in a user profile associated with the device 110 and/or user that originated the user input.

The shortlister component 350 may generate n-best list data 415 representing domains that may execute with respect to the user input represented in the text data 410. The size of the n-best list represented in the n-best list data 415 is configurable. In an example, the n-best list data 415 may indicate every domain of the system as well as contain an indication, for each domain, regarding whether the domain is likely capable to execute the user input represented in the text data 410. In another example, instead of indicating every domain of the system, the n-best list data 415 may only indicate the domains that are likely to be able to execute the user input represented in the text data 410. In yet another example, the shortlister component 350 may implement thresholding such that the n-best list data 415 may indicate no more than a maximum number of domains that may execute the user input represented in the text data 410. In an example, the threshold number of domains that may be represented in the n-best list data 415 is ten. In another example, the domains included in the n-best list data 415 may be limited by a threshold a score, where only domains indicating a likelihood to handle the user input is above a certain score (as determined by processing the text data 410 by the shortlister component 350 relative to such domains) are included in the n-best list data 415.

The text data 410 may correspond to more than one ASR hypothesis. When this occurs, the shortlister component 350 may output a different n-best list (represented in the n-best list data 415) for each ASR hypothesis. Alternatively, the shortlister component 350 may output a single n-best list representing the domains that are related to the multiple ASR hypotheses represented in the text data 410.

As indicated above, the shortlister component 350 may implement thresholding such that an n-best list output therefrom may include no more than a threshold number of entries. If the text data 410 includes more than one ASR hypothesis, the n-best list output by the shortlister component 350 may include no more than a threshold number of entries irrespective of the number of ASR hypotheses output by the ASR component 250. Alternatively or in addition, the n-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 410, the shortlister component 350 may generate confidence scores representing likelihoods that domains relate to the text data 410. If the shortlister component 350 implements a different trained model for each domain, the shortlister component 350 may generate a different confidence score for each individual domain trained model that is run. If the shortlister component 350 runs the models of every domain when text data 410 is received, the shortlister component 350 may generate a different confidence score for each domain of the system. If the shortlister component 350 runs the models of only the domains that are associated with skills indicated as enabled in a user profile associated with the device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the text data 410.

N-best list data 415 including confidence scores that may be output by the shortlister component 350 may be represented as, for example:

Search domain, 0.67
Recipe domain, 0.62
Information domain, 0.57
Shopping domain, 0.42

As indicated, the confidence scores output by the shortlister component 350 may be numeric values. The confidence scores output by the shortlister component 350 may alternatively be binned values (e.g., high, medium, low).

The n-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the text data 410 as well as respective confidence scores. The other data 420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 420 may include an indicator of the user associated with the text data 410, for example as determined by the user recognition component 295.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 350 receives the text data 410, the shortlister component 350 may determine whether profile data associated with the user and/or device 110 that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively the shortlister component 350 may run a model configured to determine a score for each domain. The shortlister component 350 may determine a same confidence score for each of the domains in the first instance. The shortlister component 350 may then alter the original confidence scores based on the type of the device 110 that originated the user input corresponding to the text data 410. For example, if the device 110 is a displayless device, the shortlister component 350 may increase the confidence score associated with the domain that generates audio data while leaving the confidence score associated with the domain that generates video data the same. Alternatively, if the device 110 is a displayless device, the shortlister component 350 may leave the confidence score associated with the domain that generates audio data the same while decreasing the confidence score associated with the domain that generates video data. Moreover, if the device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system(s) 120 indicating when the device is moving.

The other data 420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 415 generated by the shortlister component 350 as well as the different types of other data 420 considered by the shortlister component 350 are configurable. For example, the shortlister component 350 may update confidence scores as more other data 420 is considered. For further example, the n-best list data 415 may exclude relevant domains if thresholding is implemented. Thus, for example, the shortlister component 350 may include an indication of a domain in the n-best list 415 unless the shortlister component 350 is one hundred percent confident that the domain may not execute the user input represented in the text data 410 (e.g., the shortlister component 350 determines a confidence score of zero for the domain).

The shortlister component 350 may send the text data 410 to recognizers 363 associated with domains represented in the n-best list data 415. Alternatively, the shortlister component 350 may send the n-best list data 415 or some other indicator of the selected subset of domains to another component (such as the orchestrator component 230) which may in turn send the text data 410 to the recognizers 363 corresponding to the domains included in the n-best list data 415 or otherwise indicated in the indicator. If the shortlister component 350 generates an n-best list representing domains without any associated confidence scores, the shortlister component 350/orchestrator component 230 may send the text data 410 to recognizers 363 associated with domains that the shortlister component 350 determines may execute the user input. If the shortlister component 350 generates an n-best list representing domains with associated confidence scores, the shortlister component 350/orchestrator component 230 may send the text data 410 to recognizers 363 associated with domains associated with confidence scores satisfying (e.g., meeting or exceeding) a threshold minimum confidence score.

A recognizer 363 may output tagged text data generated by an NER component 362 and an IC component 364, as described herein above. The NLU component 260 may compile the output tagged text data of the recognizers 363 into a single cross-domain n-best list 440 and may send the cross-domain n-best list 440 to a pruning component 450. Each entry of tagged text (e.g., each NLU hypothesis) represented in the cross-domain n-best list data 440 may be associated with a respective score indicating a likelihood that the NLU hypothesis corresponds to the domain associated with the recognizer 363 from which the NLU hypothesis was output. For example, the cross-domain n-best list data 440 may be represented as (with each line corresponding to a different NLU hypothesis):

[0.95] Intent: <PlayMusic>ArtistName: Lady Gaga SongName: Poker Face

[0.70] Intent: <PlayVideo>ArtistName: Lady Gaga VideoName: Poker Face

[0.01] Intent: <PlayMusic>ArtistName: Lady Gaga AlbumName: Poker Face

[0.01] Intent: <PlayMusic>SongName: Pokerface

The pruning component 450 may sort the NLU hypotheses represented in the cross-domain n-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 260 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain n-best list data 460.

The cross-domain n-best list data 460 may be input to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base that is used to specifically identify the precise entity referred to in each slot of each NLU hypothesis represented in the cross-domain n-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output an altered n-best list that is based on the cross-domain n-best list 460 but that includes more detailed information (e.g., entity IDs) about the specific entities mentioned in the slots and/or more detailed slot data that can eventually be used by a skill. The NLU component 260 may include multiple entity resolution components 470 and each entity resolution component 470 may be specific to one or more domains.

The NLU component 260 may include a reranker 490. The reranker 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 470.

The reranker 490 may apply re-scoring, biasing, or other techniques. The reranker 490 may consider not only the data output by the entity resolution component 470, but may also consider other data 491. The other data 491 may include a variety of information. For example, the other data 491 may include skill rating or popularity data. For example, if one skill has a high rating, the reranker 490 may increase the score of a NLU hypothesis that may be processed by the skill. The other data 491 may also include information about skills that have been enabled by the user that originated the user input. For example, the reranker 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of device 110, user identifier, context, as well as other information. For example, the reranker 490 may consider when any particular skill is currently active (e.g., music being played, a game being played, etc.).

As illustrated and described, the entity resolution component 470 is implemented prior to the reranker 490. The entity resolution component 470 may alternatively be implemented after the reranker 490. Implementing the entity resolution component 470 after the reranker 490 limits the NLU hypotheses processed by the entity resolution component 470 to only those hypotheses that successfully pass through the reranker 490.

The reranker 490 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 350 may only process with respect to these latter domains. Results of these two NLU processing paths may be merged into NLU output data 485, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 485, skill result data 430, and the other data 420 in order to output ranked output data 425. The ranked output data 425 may include an n-best list where the NLU hypotheses in the NLU results data 485 are reordered such that the n-best list in the ranked output data 425 represents a prioritized list of skills to respond to a user input as determined by the post-NLU ranker 265. The ranked output data 425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 430 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 430a generated from the first skill 290a's execution with respect to the first NLU hypothesis. The post-NLU ranker 265 also receives, from the second skill 290b, second results data 430b generated from the second skill 290b's execution with respect to the second NLU hypothesis.

The result data 430 may include various portions. For example, the result data 430 may include content (e.g., audio data, text data, and/or video data) to be output to a user. The result data 430 may also include a unique identifier used by the system(s) 120 and/or the skill system(s) 125 to locate the data to be output to a user. The result data 430 may also include an instruction. For example, if the user input corresponds to "turn on the light," the result data 430 may include an instruction causing the system to turn on a light associated with a profile of the device (110a/110b) and/or user.

The post-NLU ranker 265 may consider the first result data 430a and the second result data 430b to alter the first confidence score and the second confidence score of the first NLU hypothesis and the second NLU hypothesis, respectively. That is, the post-NLU ranker 265 may generate a third confidence score based on the first result data 430a and the first confidence score. The third confidence score may correspond to how likely the post-NLU ranker 265 determines the first skill will correctly respond to the user input. The post-NLU ranker 265 may also generate a fourth confidence score based on the second result data 430b and the second confidence score. One skilled in the art will appreciate that a first difference between the third confidence score and the fourth confidence score may be greater than a second difference between the first confidence score and the second confidence score. The post-NLU ranker 265 may also consider the other data 420 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 430 associated with the skill 290 with the highest altered confidence score to be the data output in response to the current user input. The post-NLU ranker 265 may also consider the text data 410 to alter the NLU hypotheses confidence scores.

The orchestrator component 230 may, prior to sending the NLU results data 485 to the post-NLU ranker 265, associate intents in the NLU hypotheses with skills 290. For example, if a NLU hypothesis includes a<PlayMusic>intent, the orchestrator component 230 may associate the NLU hypothesis with one or more skills 290 that can execute the <PlayMusic>intent. Thus, the orchestrator component 230 may send the NLU results data 485, including NLU hypotheses paired with skills 290, to the post-NLU ranker 265. In response to text data 410 corresponding to "what should I do for dinner today," the orchestrator component 230 may generates pairs of skills 290 with associated NLU hypotheses corresponding to:

Skill 1/NLU hypothesis including <Help>intent
Skill 2/NLU hypothesis including <Order>intent
Skill 3/NLU hypothesis including <DishType>intent The post-NLU ranker 265 queries each skill 290, paired with a NLU hypothesis in the NLU output data 485, to provide result data 430 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help>intent indicator
Skill 2: Second NLU hypothesis including <Order>intent indicator
Skill 3: Third NLU hypothesis including <DishType>intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 430. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 430 indicating slots of a framework that the skill 290 further needs filled or entities that the skill 290 further needs resolved prior to the skill 290 being able to provided result data 430 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help>intent indicator
Skill 2: indication representing the skill needs to the system to obtain further information
Skill 3: indication representing the skill can provide numerous results in response to the third NLU hypothesis including the <DishType>intent indicator Result data 430 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 430 provided by the skills 290 to alter the NLU processing confidence scores generated by the reranker 490. That is, the post-NLU ranker 265 uses the result data 430 provided by the queried skills 290 to create larger differences between the NLU processing confidence scores generated by the reranker 490. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 430 responsive to NLU hypotheses over skills 290 that provide result data 430 corresponding to an indication that further information is needed, as well as skills 290 that provide result data 430 indicating they can provide multiple responses to received NLU hypotheses. For example, the post-NLU ranker 265 may generate a first score for a first skill 290a that is greater than the first skill's NLU confidence score based on the first skill 290a providing result data 230a including a response to a NLU hypothesis. For further example, the post-NLU ranker 265 may generate a second score for a second skill 290b that is less than the second skill's NLU confidence score based on the second skill 290b providing result data 430b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 430c indicating the third skill 290c can provide multiple responses to a NLU hypothesis.

The post-NLU ranker 265 may consider other data 420 in determining scores. The other data 420 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 420 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 485, the post-NLU ranker 265 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 420 may include information indicating the veracity of the result data 430 provided by a skill 290. For example, if a user says "tell me a recipe for pasta sauce," a first skill 290a may provide the post-NLU ranker 265 with first result data 430a corresponding to a first recipe associated with a five star rating and a second skill 290b may provide the post-NLU ranker 265 with second result data 430b corresponding to a second recipe associated with a one star rating. In this situation, the post-NLU ranker 265 may increase the NLU processing confidence score associated with the first skill 290a based on the first skill 290a providing the first result data 430a associated with the five star rating and/or decrease the NLU processing confidence score associated with the second skill 290b based on the second skill 290b providing the second result data 430b associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 420 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oreg. A second skill 290b may operate with respect to trains that arrive at, depart from, and pass through Portland, Me. If the device and/or user that originated the user input is located in Seattle, Wash., the post-NLU ranker 265 may increase the NLU processing confidence score associated with the first skill 290a and/or decrease the NLU processing confidence score associated with the second skill 290b. Likewise, if the device and/or user that originated the user input is located in Boston, Mass., the post-NLU ranker 265 may increase the NLU processing confidence score associated with the second skill 290b and/or decrease the NLU processing confidence score associated with the first skill 290a.

The other data 420 may include information indicating a time of day. The system may be configured with skills 290 that operate with respect to certain times of day. For example, a user may provide a user input corresponding to "order me food." A first skill 290a may generate first result data 430a corresponding to breakfast. A second skill 290b may generate second result data 430b corresponding to dinner. If the system(s) 120 receives the user input in the morning, the post-NLU ranker 265 may increase the NLU processing confidence score associated with the first skill 290a and/or decrease the NLU processing score associated with the second skill 290b. If the system(s) 120 receives the user input in the afternoon or evening, the post-NLU ranker 265 may increase the NLU processing confidence score associated with the second skill 290b and/or decrease the NLU processing confidence score associated with the first skill 290a.

The other data 420 may include information indicating user preferences. The system may include multiple skills 290 configured to execute in substantially the same manner. For example, a first skill 290a and a second skill 290b may both be configured to order food from respective restaurants.

The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 265 may increase the NLU processing confidence score associated with the first skill 290a and/or decrease the NLU processing confidence score associated with the second skill 290b.

The other data 420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290a that generates audio data. The post-NLU ranker 265 may also or alternatively decrease the NLU processing confidence score associated with a second skill 290b that generates image data or video data.

The other data 420 may include information indicating how long it took a skill 290 to provide result data 430 to the post-NLU ranker 265. When the post-NLU ranker 265 multiple skills 290 for result data 430, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 420 to increase and decrease NLU processing confidence scores associated with various skills 290 that the post-NLU ranker 265 has already requested result data from. Alternatively, the post-NLU ranker 265 may use the other data 420 to determine which skills 290 to request result data from. For example, the post-NLU ranker 265 may use the other data 420 to increase and/or decrease NLU processing confidence scores associated with skills 290 associated with the NLU results data 485 output by the NLU component 260. The post-NLU ranker 265 may select n-number of top scoring altered NLU processing confidence scores. The post-NLU ranker 265 may then request result data 430 from only the skills 290 associated with the selected n-number of NLU processing confidence scores.

As described, the post-NLU ranker 265 may request result data 430 from all skills 290 associated with the NLU results data 485 output by the NLU component 260. Alternatively, the system(s) 120 may prefer result data 430 from skills implemented entirely by the system(s) 120 rather than skills at least partially implemented by the skill system(s) 125. Therefore, in the first instance, the post-NLU ranker 265 may request result data 430 from only skills associated with the NLU results data 485 and entirely implemented by the system(s) 120. The post-NLU ranker 265 may only request result data 430 from skills associated with the NLU results data 485, and at least partially implemented by the skill system(s) 125, if none of the skills, wholly implemented by the system(s) 120, provide the post-NLU ranker 265 with result data 430 indicating either data response to the NLU results data 485, an indication that the skill can execute the user input, or an indication that further information is needed.

As indicated above, the post-NLU ranker 265 may request result data 430 from multiple skills 290. If one of the skills 290 provides result data 430 indicating a response to a NLU hypothesis and the other skills provide result data 430 indicating either they cannot execute or they need further information, the post-NLU ranker 265 may select the result data 430 including the response to the NLU hypothesis as the data to be output to the user. If more than one of the skills 290 provides result data 430 indicating responses to NLU hypotheses, the post-NLU ranker 265 may consider the other data 420 to generate altered NLU processing confidence scores, and select the result data 430 of the skill associated with the greatest score as the data to be output to the user.

A system that does not implement the post-NLU ranker 265 may select the highest scored NLU hypothesis in the NLU results data 485. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 485 to provide result data 430 to the post-NLU ranker 265 prior to the post-NLU ranker 265 ultimately determining the skill 290 to be invoked to respond to the user input. Some of the skills 290 may provide result data 430 indicating responses to NLU hypotheses while other skills 290 may providing result data 430 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 430, associated with the skill 290 associated with the highest score, for output to the user. Alternatively, the post-NLU ranker 265 may output ranked output data 425 indicating skills 290 and their respective post-NLU ranker rankings. Since the post-NLU ranker 265 receives result data 430, potentially corresponding to a response to the user input, from the skills 290 prior to post-NLU ranker 265 selecting one of the skills or outputting the ranked output data 425, little to no latency occurs from the time skills provide result data 430 and the time the system outputs responds to the user.

If the post-NLU ranker 265 selects result audio data to be output to a user and the system determines content should be output audibly, the post-NLU ranker 265 (or another component of the system(s) 120) may cause the device 110*a* and/or the device 110*b* to output audio corresponding to the result audio data. If the post-NLU ranker 265 selects result text data to output to a user and the system determines content should be output visually, the post-NLU ranker 265 (or another component of the system(s) 120) may cause the device 110*b* to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill 290 may provide result data 430 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 430 indicating a response to the user input, the post-NLU ranker 265 (or another component of the system(s) 120, such as the orchestrator component 230) may simply cause content corresponding to the result data 430 to be output to the user. For example, the post-NLU ranker 265 may send the result data 430 to the orchestrator component 230. The orchestrator component 230 may cause the result data 230 to be sent to the device (110*a*/110*b*), which may output audio and/or display text corresponding to the result data 230. The orchestrator component 230 may send the result data 430 to the ASR component 250 to generate output text data and/or may send the result data 430 to the TTS component 280 to generate output audio data, depending on the situation.

The skill 290 associated with the highest post-NLU ranker score may provide the post-NLU ranker 265 with result data 430 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 265 may simply cause the received instruction data be output by the device (110*a*/110*b*). Alternatively, the instruction data may be in a format that is not capable of being output by the device (110*a*/110*b*). When this occurs, the post-NLU ranker 265 may cause the ASR component 250 or the TTS component 280 to process the instruction data, depending on the situation, to generate instruction data that may be output by the device (110*a*/110*b*). Once the user provides the system with all further information needed by the skill 290, the skill 290 may provide the system with result data 430 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 430 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 430, the system may further engage a transactional skill 290 after the transactional skill 290 provides the post-NLU ranker 265 with result data 430 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 5:
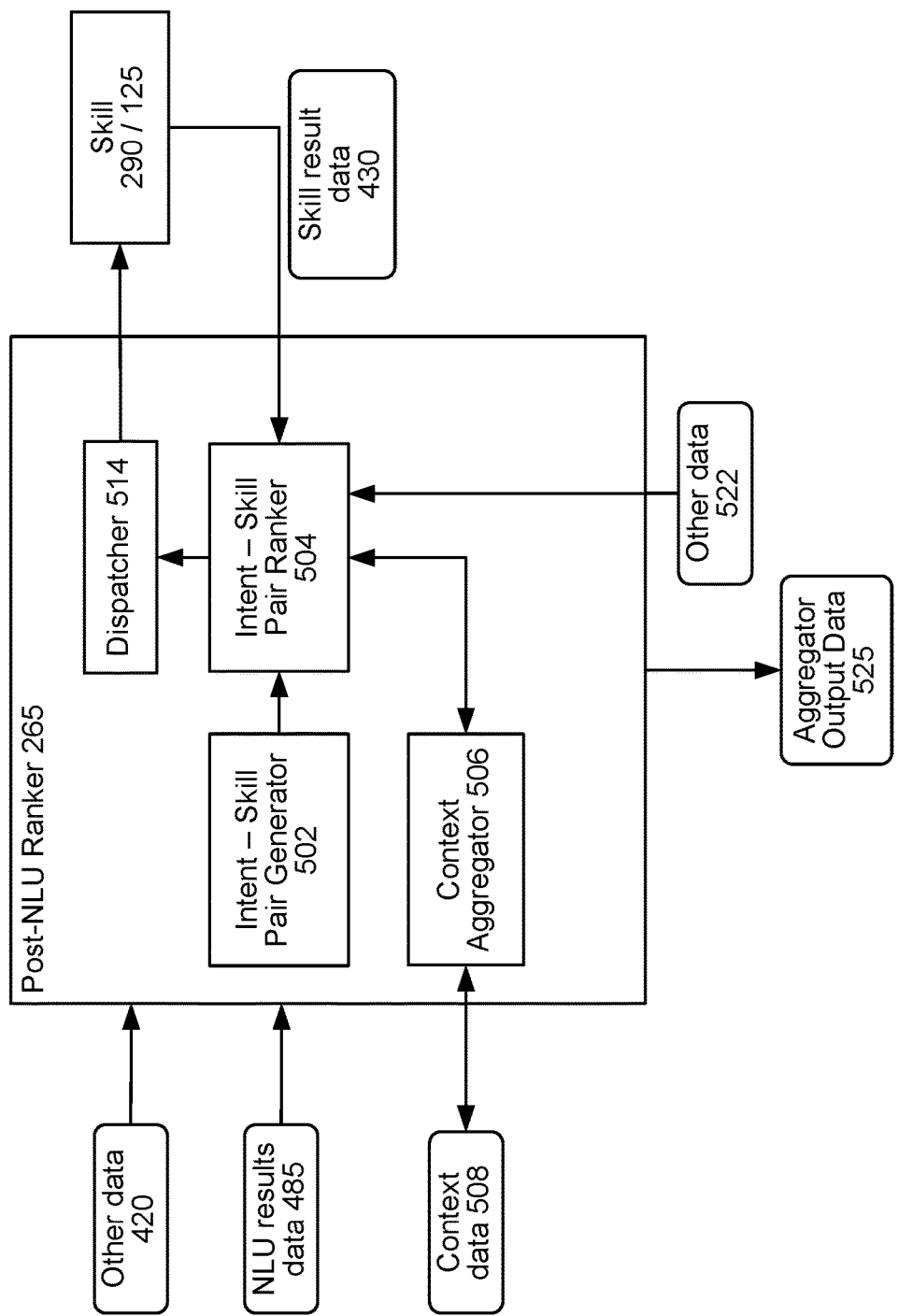
FIG. 5 is a conceptual diagram illustrating how a post-NLU ranker may process according to embodiments of the present disclosure.

FIG. 5 illustrates other configurations and operations of the post-NLU ranker 265. When the post-NLU ranker 265 receives NLU results data 485, the NLU results data 485 may be sent to an intent-skill pair generator 502. The intent-skill pair generator 502 may include information about what skills are capable of handling what intents. Such information may be context agnostic, and may thus indicate what skills are capable of handling what intents generally, without regard to the context associated with the user input. The intent-skill pair generator 502 thus receives the NLU results data 485 and identifies what particular candidate skills may handle the intent for NLU hypothesis. For example, if a NLU hypothesis includes a particular intent, the intent-skill pair generator 502 identifies each skill that may execute with respect to the intent. For further example, if the NLU results data 485 include multiple NLU hypotheses including multiple intents, the intent-skill pair generator 502 associates each different NLU hypothesis with each skill that may execute with respect to the NLU hypothesis. As illustrated, the intent-skill pair generator 502 may be implemented at part of the post-NLU ranker 265. However, one skill in the art will appreciate that the intent-skill pair generator 502 may be implemented as part of the NLU component 260 or in another component without departing from the present disclosure. In such a case, the NLU results data 485 may include intent-skill pairs.

The post-NLU ranker 265 may also include an intent-skill pair ranker 504. The intent-skill pair ranker 504 ranks the intent-skill pairs generated by the intent-skill pair generator 502 based on, for example, the number of filled slots of a NLU hypothesis, an NLU confidence score associated with a NLU hypothesis, context information output by a context aggregator 506, and/or other data.

The post-NLU ranker 265 may include the context aggregator 506. The context aggregator 506 receives context data 508 from various contextual sources. The context data 508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 506 may aggregate the context data 508 and put the context data 508 in a form that can be processed by the intent-skill pair ranker 504. Context data 508 may include data obtained from the device 110 or from other services connected to the system(s) 120.

The context data 508 may include skill availability data. Such information may indicate what skills are available and authorized to process the user input. For example, if the user has only enabled certain skills, the enabled skills may be noted in the skill availability data.

The context data 508 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 230, skill(s) 290, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 508 may be one portion of the data used by the intent-skill pair ranker 504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 508 (and/or other data 522) may include a metadata flag/indicator that represents whether the particular skill being executed is one that can handle a go-back (or other navigational) request.

The context data 508 may also include user profile data. The user profile data may represent preferences and/or characteristics of the user that originated the current user input. Such data may be received from the profile storage 270.

The context data 508 may also include location data. The location data may represent a location of the device 110 from which the user input was received.

The context data 508 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 508 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 508 may also include other context data not explicitly recited herein.

The intent-skill pair ranker 504 may operate one or more trained models that are configured to process the NLU results data 485, skill result data 430, and other data 522 in order to determine a single best skill for executing the current user input from the available pairs output by the intent-skill pair generator 502. The intent-skill pair ranker 504 may send queries to the skills and request a first skill and a second skill (for example the candidate skills identified by the pair generator 502), to provide potential result data indicating whether the skill can handle the intent at the particular moment and if so, what the output data for the particular skill would be (e.g., data the skill would provide to a user if the skill were selected to execute the user input) based on the NLU results data 485. For example, the intent-skill pair ranker 504 may send a first NLU hypothesis, associated with a first skill, to the first skill along with a request for the first skill to at least partially execute with respect to the first NLU hypothesis. The intent-skill pair ranker 504 may also send a second NLU hypothesis, associated with the second skill, to the second skill along with a request for the second skill to at least partially execute with respect to the second NLU hypothesis. The intent-skill pair ranker 504 receives, from the first skill, first result data 430a generated from the first skill's execution with respect to the first NLU hypothesis. The intent-skill pair ranker 504 also receives, from the second skill, second results data 430b generated from the second skill's execution with respect to the second NLU hypothesis. Based on the first results data 430a, a first NLU confidence score associated with the first NLU hypothesis, the second results data 430b, a second NLU confidence score associated with the second NLU hypothesis, and other data 522 (e.g., context data, user profile data, etc.), the intent-skill pair ranker 504 determines the best skill for executing the current user input. The intent-skill pair ranker 504 sends an indication of the best skill to a dispatcher component 514.

The dispatcher 514 may then send the selected skill the information needed to execute the user input, including an indication of the intent, the appropriate context data 508 (such as device identifier, user identifier, or the like), slot data, utterance identifier, dialog identifier, or any other information needed.

One or more models implemented by components of the orchestrator component 230, post-NLU ranker 265, shortlister 350, or other component may be trained and operated according to various machine learning techniques.

Figure 6:
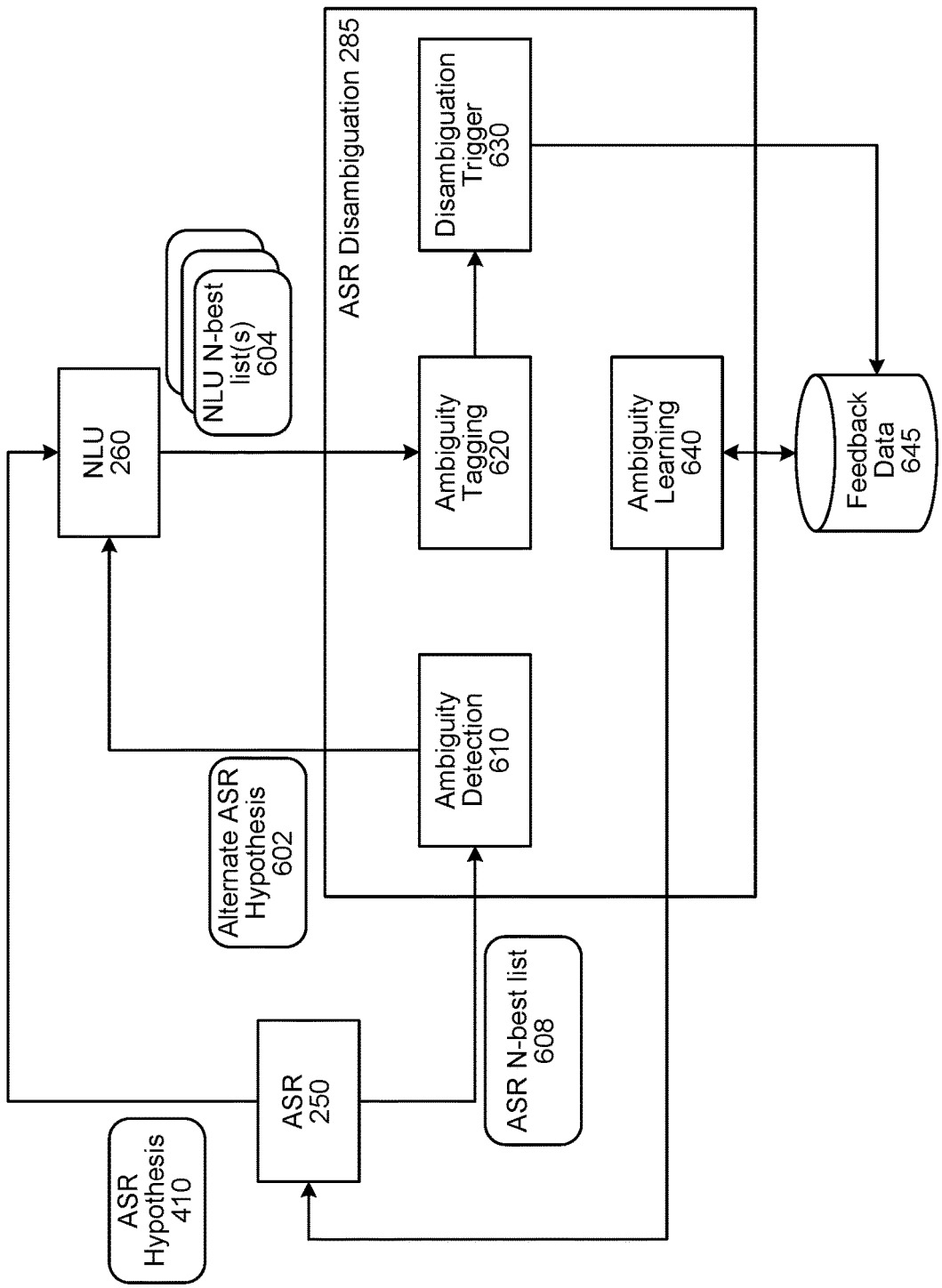
FIG. 6 is a conceptual diagram illustrating components of the ASR disambiguation component that the system can use according to embodiments of the present disclosure.

FIG. 6 is a conceptual diagram illustrating components of the ASR disambiguation component 285 that the system can use according to embodiments of the present disclosure. The ASR disambiguation component 285 may include an ambiguity detection component 610, an ambiguity tagging component 620, a disambiguation trigger component 630, and an ambiguity learning component 630. The ASR disambiguation component 285 may send and receive data from other components of the system(s) 120, such as the ASR component 250 and NLU component 260 as illustrated in FIG. 6. The disambiguation component 285 may store data in a feedback data storage 645 relating to dialog sessions that involve disambiguation. One or more of the components 610, 620, 630 and 640 may be implemented as part of the disambiguation component 285, as part of other components of the system(s) 120, or may be implemented outside of the system(s) 120 depending on the system configuration. For example, the ambiguity detection component 610 may implemented within the ASR disambiguation component 285 or within the ASR component 250. The ambiguity tagging component 620 may be implemented within the ASR disambiguation component 285 or within the NLU component 260. The disambiguation trigger component 630 may be implemented within the ASR disambiguation component 285 or as part of another component of system(s) 120. The ambiguity learning component 640 may be implemented within the ASR disambiguation component 285 or within the ASR component 250.

As described above, the ASR component 250 may process audio data representing an utterance from a user to determine an N-best list of ASR hypotheses corresponding to the text data that may represent the utterance. The ASR component also generates confidence scores corresponding to each ASR hypothesis. When there is confusion with respect to the ASR processing, the system 100 may have low confidence in determining what the user said, which may be evident in low ASR confidence scores.

As described above, the NLU component 260 may process one ASR hypothesis (e.g., the ASR hypothesis with the highest confidence score, the ASR 1-best hypothesis, etc.) to generate NLU data including intent data, slot data and a confidence score. In some embodiments, for disambiguation purposes the NLU component 260 may be configured to process two ASR hypotheses. For example, the NLU component 260 may process the ASR 1-best hypothesis to generate an interpretation and corresponding NLU data. The NLU component 260 may also process another ASR hypothesis, for example, the 2-best ASR hypothesis or another hypothesis sent to the NLU component 260, to generate a second interpretation and corresponding NLU data. The second ASR hypothesis may represent a hypothesis that the system 100 determines to be ambiguous at least because of the confidence score corresponding to the 1-best and the second ASR hypothesis.

The ambiguity detection component 610 may be configured to perform a first pass detection of ambiguity using the ASR N-best list and identify potential ambiguous alternatives that may be processed by the NLU component 260. The ambiguity tagging component 620 may be configured to combine or merge the multiple interpretations generated by the NLU component 260 into a single N-best NLU list. The ambiguity tagging component 620 may also be configured to tag (e.g., associate indication data with) the NLU interpretations using the ambiguous and/or alternative ASR hypothesis with ambiguity scores. The disambiguation trigger component 630 may be configured to process the merged N-best NLU list and the ambiguity scores to determine if disambiguation should be performed and what kind of disambiguation should be performed. The ambiguity learning component 640 may be configured to process disambiguation data and user feedback to determine which components in the system 100 can learn or retrain using the dialog session data.

To determine which hypotheses of the N-best ASR list are relevant to facilitating disambiguation, the N-best ASR list 608 is sent to the ambiguity detection component 610 to narrow down the ASR N-best to one or two alternate hypotheses that are likely ambiguous with respect to the ASR 1-best hypothesis. The ambiguity detection component 610 may perform ambiguity detection using historical feedback signals to determine which ASR hypotheses 608 are ambiguous. The historical feedback signals may include data corresponding to historical dialog exchanges where the user rephrases the initial user request in response to the system generating an error. If the user rephrase resulted in successful processing, then the rephrase may be stored as an alternate ASR hypothesis (along with a confidence score) corresponding to the ASR 1-best hypothesis associated with the initial user input. In some embodiments, the ambiguity detection component 610 determines whether an ASR 1-best hypothesis has a corresponding alternate ASR hypothesis, and if the confidence score associated with the alternate ASR hypothesis exceeds a threshold.

In some embodiments, the ambiguity detection component 610 may filter the N-best ASR list to the top two hypotheses (2-best ASR list). The ambiguity detection component 610 may normalize the two hypotheses (represented as text data) by removing articles and other words determined to not be useful for disambiguation. Such normalization can reduce the number of false disambiguation triggers that may be caused by insignificant differences in the words, for example "a song" versus "the song" or "book" versus "books."

The ambiguity detection component 610 may then generate a word-level alignment between the two ASR hypotheses. As described above, an ASR hypothesis may be represented as text and each word in the text may have a corresponding score (e.g., token-level confidence). The ambiguity detection component 610, using the word-level alignment, may generate features/words for substitution, insertion and/or deletion from the ASR hypothesis based on the token-level confidences. Using a set of rules or a shallow model to process the top scoring features of the second ASR hypothesis, the ambiguity detection component 610 may determine whether the second ASR hypothesis should be processed by the NLU component 260. The set of rules or shallow model may leverage the confidence threshold-based binary features and/or the difference in confidence when certain words are substituted with other words.

In an example embodiment, the ambiguity detection component 610 may determine that the ambiguity relates to an entity represented in the ASR hypothesis based on a token-level score associated with the word representing the entity. For example, the ambiguity detection component 610 may determine that the ambiguity relates to the entities in the ASR hypotheses based on the token-level scores associated with the word "Boston" in one ASR hypothesis and the word "Austin" in another ASR hypothesis.

In an example embodiment, the ambiguity detection component 610 may also determine if a rewrite alternative of the ASR 1-best exists. For example, the ambiguity detection component 610 may retrieve data from a database using one or more words of the ASR 1-best hypothesis, where the data indicates a rewrite or replacement of one or more words of the ASR 1-best hypothesis that resulted in successful downstream processing (for example, by NLU or skills) and/or resulted in the output/response corresponding to the user's input. Thus, the ambiguity detection component 610 may produce both a rewrite alternative and an ambiguous alternative with respect to one or more of the hypotheses of the N-best ASR list. In some embodiments, the ambiguity detection component 610 may determine a score or confidence level corresponding to the rewrite alternative and a score or confidence level corresponding to the ambiguous alternative.

In an example embodiment, the ambiguity detection component 610 may select one of the rewrite or ambiguous alternative, based at least on their corresponding scores, to send to the NLU component 260 for processing. If the ambiguity detection component 610 is unable to determine a rewrite alternative and/or an ambiguous alternative, then the alternative that is determined is sent to the NLU component 260 or an indication that no ambiguity or rewrites exist for the N-best list is sent to the NLU component 260. In other embodiments, the ambiguity detection component 610 may send both of the rewrite and ambiguous alternatives to the NLU component 260 for processing. The ambiguity detection component 610 may also send data to the NLU component 260 indicating whether the ASR hypothesis corresponds to an ambiguous alternative or a rewrite alternative.

In some embodiments, the ambiguity detection component 610 may process the top two ASR hypothesis to determine ambiguous and/or rewrite ASR alternatives. In an example embodiment, the ambiguity detection component 610 may determine an additional ASR hypothesis that is not included in the N-best ASR list, and send the additional ASR hypothesis to NLU for processing. The ambiguity detection component 610 may determine the additional ASR hypothesis using data corresponding to historical ambiguous alternatives.

The NLU component 260 may process the alternate ASR hypothesis(es) 602 received from the ambiguity detection component 610 and the 1-best ASR hypothesis 405 received from the ASR component 250 to generate multiple NLU N-best lists 604 corresponding to the processed ASR hypotheses.

The ambiguity tagging component 620 may be configured to process the NLU N-best lists 604 to determine a single merged NLU N-best list, which may include tags/indications for the interpretations associated with the ambiguous ASR hypothesis. The merged NLU N-best list may also include confidence scores for interpretations associated with the ambiguous ASR hypothesis.

In some embodiments, the ambiguity tagging component 620 may first merge and rank the NLU N-best lists into a single flattened list. In an example embodiment, the ambiguity tagging component 620 may append the NLU N-best list corresponding to the ambiguous alternative ASR hypothesis to the NLU N-best list corresponding to the ASR 1-best hypothesis. The generated merged list thus includes a list of NLU hypotheses corresponding to the ASR 1-best and the ambiguous alternative ASR hypothesis and their associated confidence scores. The merged list may be ranked based on the scores corresponding to each NLU hypothesis. Thus, a NLU hypothesis corresponding to the ASR 1-best list may be ranked lower than a NLU hypothesis corresponding to the ambiguous alternative ASR hypothesis.

In another example embodiment, the ambiguity tagging component 620 may determine scores corresponding to each hypothesis in the NLU N-best lists 604, where the scores may be determined using the ASR scores and the NLU scores corresponding to the NLU hypothesis.

After merging and ranking, the ambiguity tagging component 620 may perform ambiguity tagging. The NLU N-best list can also include metadata associated with each hypothesis, for example, an ambiguity confidence score and/or a tag indicating other information related to the NLU hypothesis. In an example embodiment, the ambiguity confidence score associated with the NLU hypothesis may be a rule-based combination of the corresponding ASR score (derived from the ASR N-best list) and the NLU score (derived from the NLU N-best list). In case of the ambiguous alternative ASR hypothesis, the ambiguity confidence score may be a combination of the score determined by the ambiguity detection component 610 and the corresponding NLU score. In another example embodiment, the ambiguity confidence score may be determined using one or more machine learning models, statistical models, and other techniques. The ambiguity tagging component 620 may then tag one or more of the NLU hypothesis in the merged NLU N-best list to indicate if the hypothesis corresponds to an ambiguous alternative ASR hypothesis, the 1-best ASR hypothesis, or other ASR hypotheses that the NLU component 260 processed. Thus, in addition to the ambiguity confidence scores, the downstream systems can use the tag to determine additional information related to the NLU hypothesis that can facilitate the system in generating an appropriate response.

In an example embodiment, the merged NLU N-best list may be processed by the post-NLU ranker 265 to further rank and filter the merged NLU N-best list as described above.

In some embodiments, the disambiguation component 285 may be configured to resolve slot value ambiguities. As used herein, slot values refers to the value/text inserted in the slot determined by the NLU component, for example, the value/text corresponding to {Artist Name} or {Song Name} as described above. There are three types of slot value ambiguity that the system 100 may resolve: intra-domain slot value ambiguity, inter-domain slot value ambiguity, and domain-agnostic slot value ambiguity.

Intra-domain slot value ambiguity is any confusion between slot values that does not affect the routing of the user request to an appropriate domain. For example, a confusion between the contact names in the user's address book or contact list (communications domain), or the item names in the shopping list (shopping domain) does not affect which domain the user request is routed to.

Inter-domain slot value ambiguity is any confusion between slot values that may affect the routing of the user request. For example, if the user request relates to a device in the user's household (SmartHome domain), confusion in the device name may cause the request to be routed to the wrong application (e.g., an oven-operating application versus a refrigerator-operating application).

Domain-agnostic slot value ambiguity is any confusion between slot values for slot types that are "generic" or not specific to a domain. For example, a confusion between city names (e.g., Austin or Boston) or days of the week, which can be applicable to any number of domains and applications.

The disambiguation trigger component 630 may be configured to process the merged NLU N-best list to identify a pair of interpretations derived from different ASR hypotheses that vary in slot value. If the ambiguity confidence scores for the identified pair of interpretations exceed a threshold value, then the disambiguation trigger component 630 may trigger explicit disambiguation to determine the correct interpretation and slot value. In an explicit disambiguation, the disambiguation trigger component 630 may cause the system 100 to generate output data requesting the user for feedback with respect to the ambiguity.

In an example embodiment, if the ambiguity confidence score of the identified pair of interpretations are similar (within a threshold of each other) indicating that the respective slot values have a similar likelihood of corresponding to the user's request, then during the explicit disambiguation, the disambiguation trigger component 630 may request the user to choose between the two slot values. For example, the system 100 may output "Did you mean Austin or Boston?"

In another example embodiment, if the ambiguity confidence score of one of the interpretations from the pair of interpretations is significantly higher than the other interpretation, then during the explicit disambiguation, the disambiguation trigger component 630 may request the user to confirm the slot value with the higher ambiguity confidence score. For example, the system 100 may output "Did you mean Austin?"

In some embodiments, the disambiguation trigger component 630 may include additional data, for example, contextual data, associated with the slot values that may clarify the slot value. For example, the system 100 may output "Do you mean Austin, Tex. or Boston, Mass.?" where adding Texas and Massachusetts provides additional context to the slot values.

The user may provide input in relation to the explicit disambiguation request. The user input may indicate a selection of one of the slot values, or a confirmation of the slot value. The user input may be processed by the ASR component 250 and the NLU component 260 as described above. The ASR data and the NLU data corresponding to the user input may be provided to the disambiguation trigger component 630.

The disambiguation trigger component 630 may store data relating to the dialog session in the feedback data storage 645. The dialog session data may include audio data corresponding the initial user request, two or more ASR hypotheses (along with ASR scores) corresponding to the initial user request, the pair of identified NLU interpretations used by the disambiguation trigger component 630 for explicit disambiguation, the user input selecting or confirming the slot value, and the corrected/final interpretation that is used to generate an output in response to the user's initial request. The feedback data storage 645 may store data relating to a dialog covering the initial request from the user, the explicit disambiguation request from the system, and the user's response to the explicit disambiguation request.

The ASR disambiguation component 285 may processes various ASR and NLU data/signals to determine if the system 100 should ask the user for clarification (trigger explicit disambiguation) with respect to the initial user input. In an example embodiment, the ASR ambiguity or confusion may be caused by similar sounding words or mispronunciations that may cause slot value ambiguity. For example, the user may say "what's the weather in Boston?" The system 100 may determine that the ASR and NLU scores relating to the slot value indicate ambiguity in whether the user said "Boston" or "Austin." In such cases, the ASR disambiguation component 285 may determine to request explicit disambiguation between the two ambiguous/potential slot values.

In another example embodiment, the ambiguity may be caused by an out-of-vocabulary word that the ASR machine-learning model(s) and/or the ASR component 250 may not be trained to recognize. The system 100 may generate a low ASR confidence score corresponding to the out-of-vocabulary word, and the ASR disambiguation component 285 may tag the ASR/NLU hypothesis to indicate that it includes an out-of-vocabulary word. In such cases, the ASR disambiguation component 285 may determine to request explicit confirmation from the user with respect to the out-of-vocabulary word. If the user confirms, then the out-of-vocabulary word may be processed by the system 100 to retrain the ASR model(s) to recognize the out-of-vocabulary word. In some cases, the out-of-vocabulary word may be used to retrain a user-specific model, if the out-of-vocabulary word is not widely used by other users.

In another example embodiment, the ambiguity may be caused with respect to certain actions. For example, the user may say "open the front door." The system 100 may generate a low ASR/NLU confidence score for the user request. The ASR disambiguation component 285 may tag the ASR/NLU hypothesis to indicate that it relates to a certain type of action. In such cases, the ASR disambiguation component 285 may request explicit confirmation with respect to the user request: "can you confirm that you want to open the front door?"

The ambiguity learning component 640 may be configured to process data stored in the feedback data storage 645 to determine how the components in the system 120 can learn or update their processes and machine-learning models.

Figure 7:
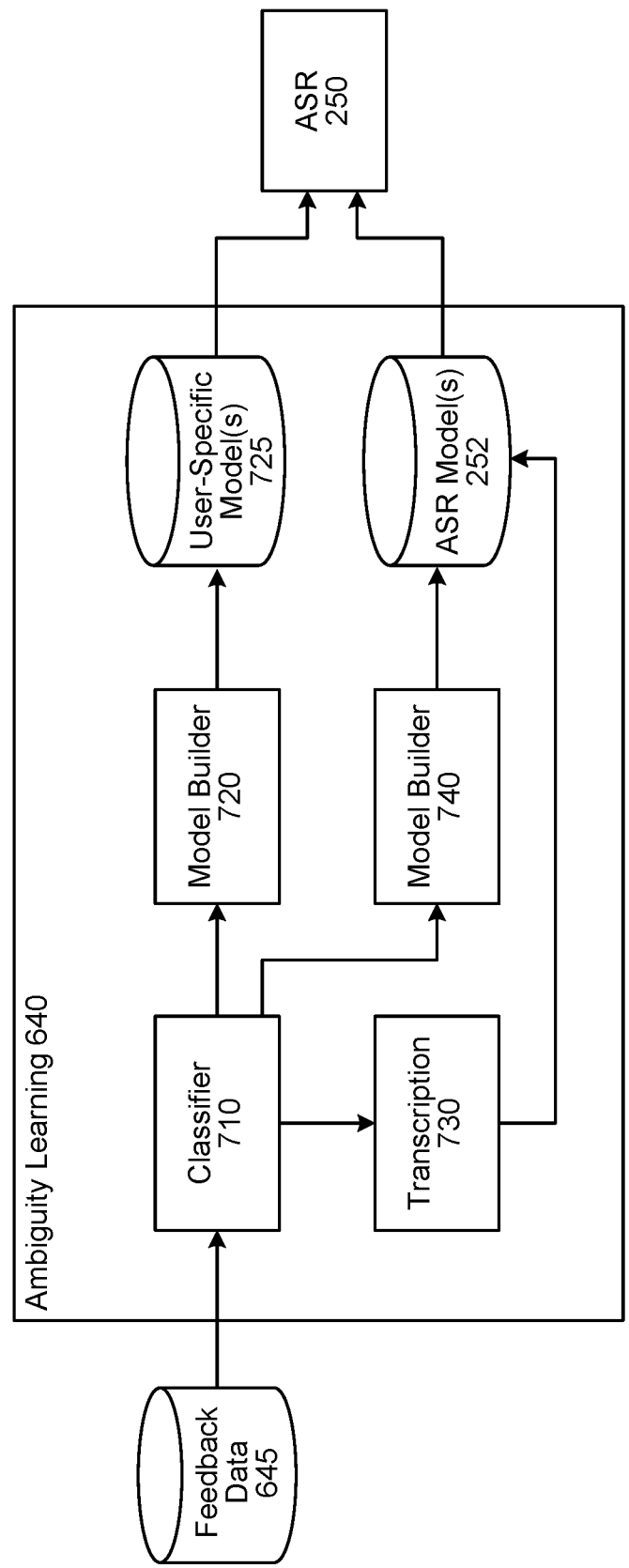
FIG. 7 is a conceptual diagram illustrating components of the ambiguity learning component according to embodiments of the present disclosure.

FIG. 7 is a conceptual diagram illustrating components of the ambiguity learning component 640. The ambiguity learning component 640 may include a classifier component 710, multiple model builder components 720 and 740, and a transcription component 730. The ambiguity learning component 640 may store data, for example, model data in user-specific model(s) storage 725 and/or the ASR model(s) storage 252. The model data stored in 725 and 252 may be used by the ASR component 250 to process user inputs as described above.

In example embodiment, the classifier component 710 may be configured to process data the feedback data storage 645 relating to a dialog session to determine in which manner the system can learn from the data.

The classifier component 710 may identify a confidence score associated with the final interpretation corresponding to the dialog session. The confidence score may be determined using the ASR score(s) and/or ASR N-best list generated by the ASR component 250 when processing the audio data (e.g., utterance from user 5 providing feedback with respect to the ambiguity) that resulted in the final interpretation. The confidence score may also be determined using the NLU score(s) and/or NLU N-best list generated by the NLU component 260 when processing the ASR data corresponding to the audio data that resulted in the final interpretation. In other words, the confidence score associated with the final interpretation may indicate a level of confidence that the speech processing system understood what the user said. If the confidence score exceeds a threshold, then the classifier component 710 may determine that the dialog session data can be used to train/retrain/update one or more machine learning models or to generate one or more new machine learning models.

If the confidence score is below the threshold, then the classifier component 710 may determine that the initial user request needs to be transcribed, and sends the audio data corresponding to the initial user request to the transcription component 730. In some cases, a dialog session involving disambiguation may not result in the user providing feedback and/or the system determining a final interpretation to use for responding to the user's initial request. In such cases, the classifier component 710 may determine that the initial user request needs to be transcribed, and sends the audio data corresponding to the initial user request to the transcription component 730 for transcription. The transcription component 730 may receive text data representing an accurate transcription of the user's initial request, and may send the text data to the ASR model(s) storage 252 to be incorporated in the ASR machine-learning models.

The classifier component 710 may also process the dialog session data to determine whether the ambiguity corresponding to the dialog session is an ambiguity that is encountered by multiple users or is specifically encountered by the user associated with the dialog session. The classifier component 710 may determine that the ambiguity is encountered by multiple users by evaluating historical ambiguous utterance data and/or historical alternative utterance data to determine the frequency of this particular ambiguity occurring and the number of users that had such interactions with the system 100. If the frequency and/or the number of users satisfy a threshold, then the classifier component 710 may determine that the ambiguity is encountered by multiple users. If the frequency and/or the number of users does not satisfy a threshold, then the classifier component 710 may determine that the ambiguity is user-specific.

In an example embodiment, the classifier component 710 may determine (second) dialog session data corresponding to a (second) user profile, and determine that the second dialog session data includes an indication of ambiguity similar to that included in first dialog session data corresponding to a first user profile. The classifier component 710 may determine that the first user profile and the second user profile are associated with a geographic location (using location data stored with respect to the user profiles). The classifier component 710 may then determine to update or generate a user-specific model and associate it with the geographic location, such that the ASR component 250 processes subsequent audio data received from devices associated with the geographic location using the user-specific model associated with the geographic location.

If the ambiguity is user-specific, then the classifier component 710 may send the dialog session data to the model builder component 720. The model builder component 720 may be configured to process the dialog session data, including the initial user request and the final interpretation, to generate one or more user-specific machine-learning models that incorporates data specific to the user. The model data corresponding to the user-specific models may be stored in the user-specific model(s) storage 725. The data in the user-specific model(s) storage 725 may be used by the ASR component 250 in conjunction with the ASR model(s) data 252 to process a user input received from a particular user. The user-specific model(s) may be associated with the user profile associated with the dialog session data.

The user-specific model(s) may employ techniques like n-gram boosting to emphasize certain words or features during ASR processing. The user-specific model(s) may also be FST(s) for specific slot values, words, and other data that may be used with the ASR model(s) to determine text data corresponding to user input more accurately taking into consideration features specific to the user.

If the ambiguity is encountered by multiple users, then the classifier component 710 may send the dialog session data to the model builder component 740. The model builder component 740 may be configured to process the dialog session data, including the initial user request and the final interpretation, to retrain/update one or more ASR machine-learning models (e.g., acoustic model(s) 253, language model(s) 254, FST(s) 255). The model data corresponding to the retrained or updated ASR models may be stored in the ASR model(s) storage 252. The data in the ASR model(s) storage 252 may be used by the ASR component 250 to process any user input received by the system(s) 120. While the data in the user-specific model(s) storage 725 may be used by the ASR component 250 to process user input from one or more specific users (determined using the corresponding user profile).

In another example embodiment, the ASR ambiguity may be caused by the way the user speaks (e.g., pronunciations, accents, intonations, etc.) leading to ambiguity in slot values. The ASR disambiguation component 285 may determine common historical errors relating to the particular slot value. The ASR disambiguation component 285 may also determine that such ambiguity is experienced by a certain group of users or certain type of users more often than other users. In such cases, the ambiguity learning component 640 may determine to generate a new machine-learning model to learn the correct interpretation when such ambiguities are encountered, and the new model may be associated with a group of users (rather than the widely-used ASR model(s)), via the user profile data, that experience such ambiguities. The group of users may correspond to a particular location, geographic region, or may have other demographics in common with one another. The group of users may use the same type of device 110 to interact with the system(s) 120, for example, smartphone, smart speaker system, smart TV, vehicle installed smart assistant, etc.

In an example embodiment, the classifier component 710 may determine that the ambiguity is encountered at a household level, for example, by multiple users within a household. The system 100 may determine that users belong to the same household by determining that their user profiles are associated with one or more device identifiers, and data corresponding to the device identifiers indicate that the corresponding devices are located within the same household. In such cases, the classifier component 710 may send the dialog session data to the model builder 720 to generate new or update existing user-specific model(s), and associating these models with the user profiles associated with the household. Such user-specific model(s) that are determined based on dialog data corresponding to the users within a household, may incorporate features enabling ASR processing to account for accents or other speaking mannerisms that may be associated with multiple users within the household.

Figure 8:
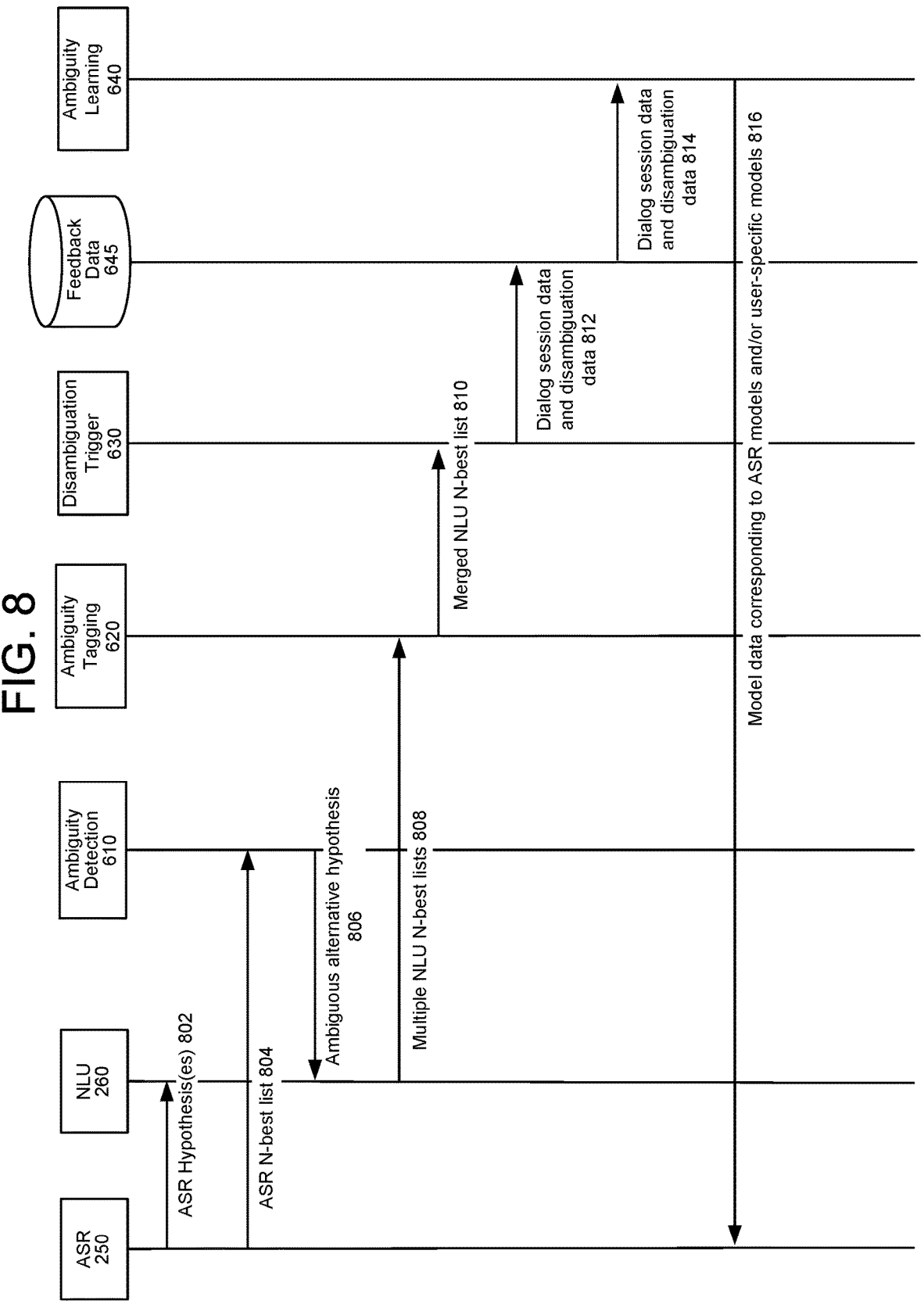
FIG. 8 is a signal flow diagram illustrating how ASR data is processed for disambiguation according to embodiments of the present disclosure.

FIG. 8 is a signal flow diagram illustrating how ASR data is processed for disambiguation according to embodiments of the present disclosure. The ASR component 250 may send (802) one or more ASR hypotheses (e.g., the top scoring ASR hypothesis or the ASR 1-best hypothesis) to the NLU component 260. The ASR component may send (804) the ASR N-best list to the ambiguity detection component 610. The ambiguity detection component 610 may send (806) one or more ambiguous alternative ASR hypotheses to the NLU component 260. The NLU component 260 may process the ASR hypothesis from the ASR component 250 and the ambiguous alternative ASR hypothesis(es) from the ambiguity detection component 610 to determine multiple corresponding NLU N-best lists. The NLU component 260 may send (808) the multiple NLU N-best lists to the ambiguity tagging component 620. The ambiguity tagging component 620 may process the NLU N-best lists to determine a single merged NLU N-best list including the NLU hypotheses from the NLU N-best lists, an ambiguity confidence score and a tag identifying additional information relating to the NLU hypothesis (e.g., which ASR hypothesis does it correspond to). The ambiguity tagging component 620 may send (810) the merged NLU N-best list to the disambiguation trigger component 630. The disambiguation trigger component 630 may determine, using the merged NLU N-best list, to request explicit disambiguation from the user. The disambiguation trigger component 630 may receive the user's feedback with respect to disambiguation request. The disambiguation trigger component 630 may store (812) dialog session data and disambiguation data to the feedback data storage 645. The ambiguity learning component 640 may retrieve (814) the dialog session data and the disambiguation data from the feedback data storage 645. The ambiguity learning component 640 may determine how the system can learn/update/retrain from the dialog session data and the disambiguation data and determine updated model data or new model data accordingly. The ambiguity learning component 640 may update the ASR model(s) or the user-specific model(s), and/or generate new ASR or user-specific model(s). The ambiguity learning component 640 may send (816) the model data corresponding to one or more ASR model(s) and/or user-specific model(s) to the ASR component 250 for use when processing subsequent user inputs.

Figure 9:
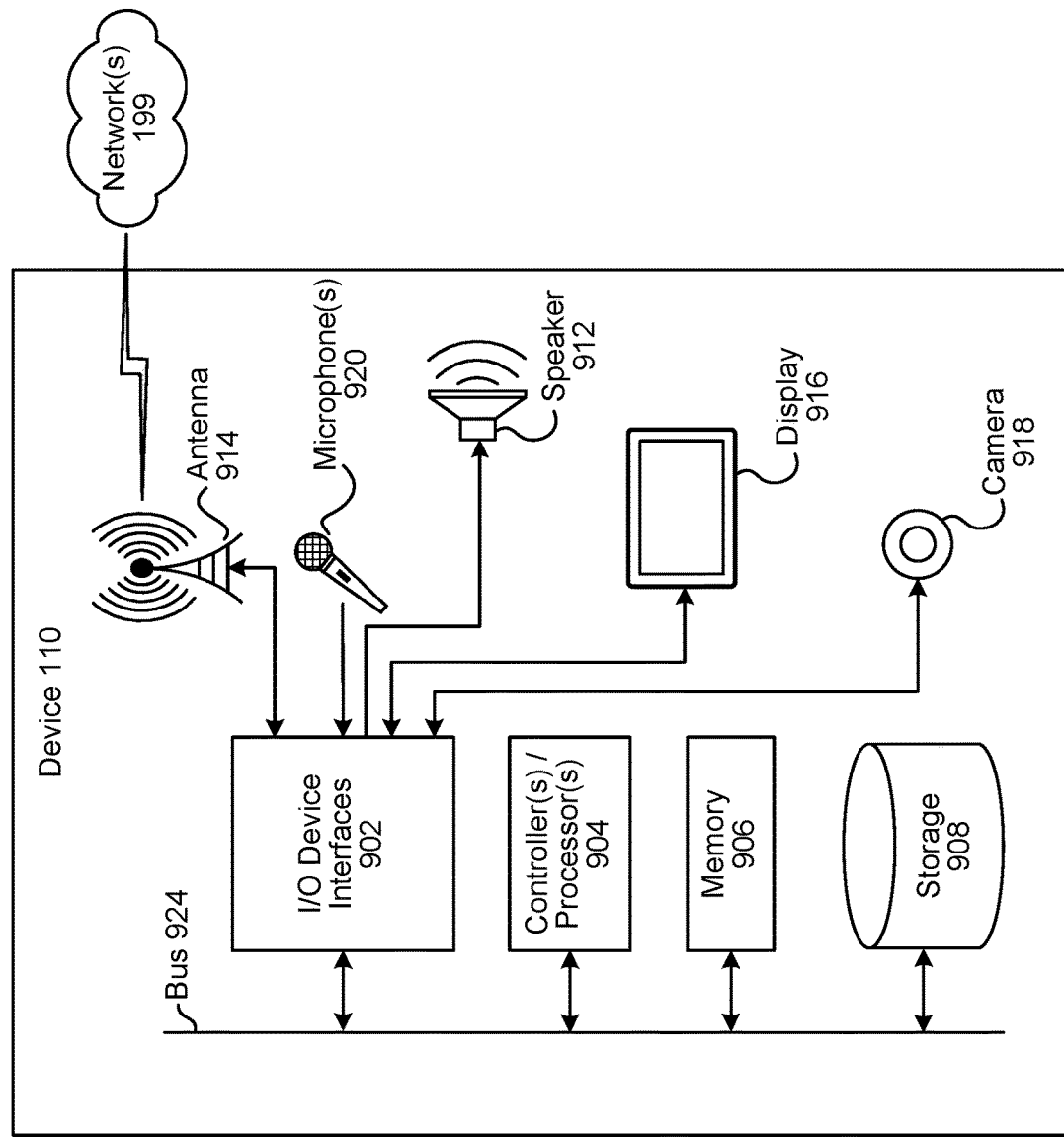
FIG. 9 is a block diagram conceptually illustrating example components of a device according to embodiments of the present disclosure.
Figure 10:
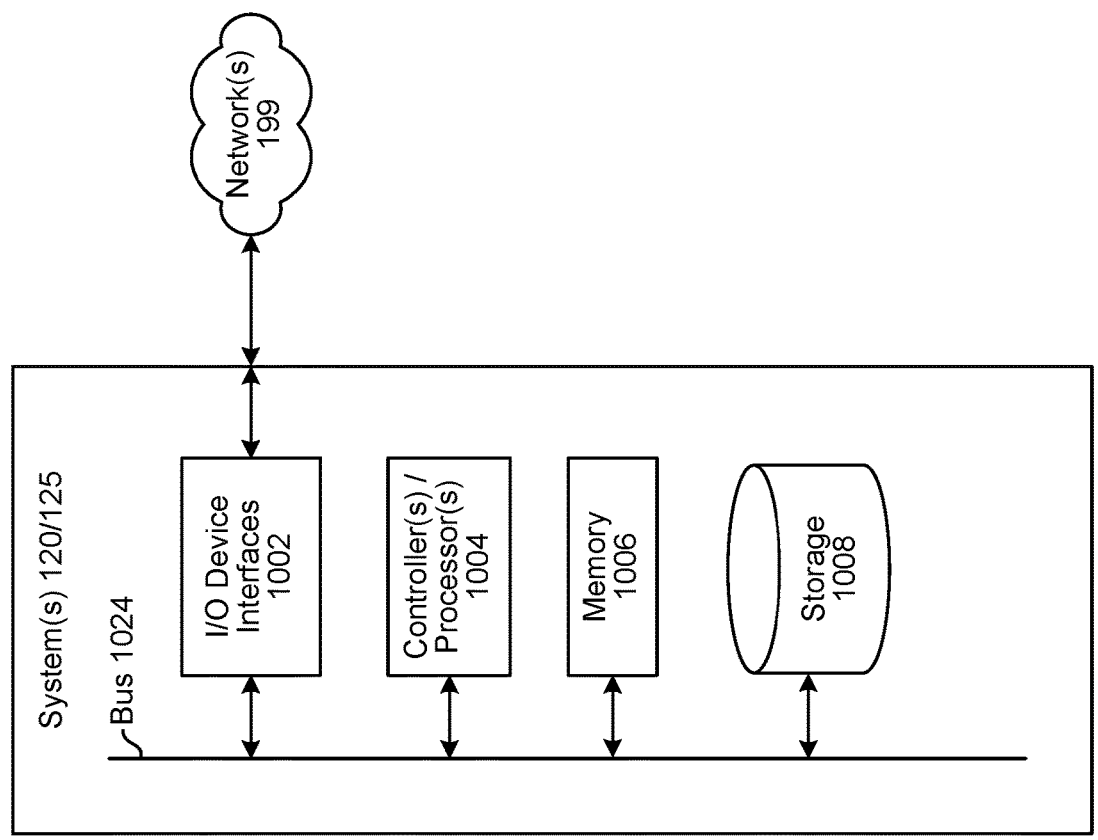
FIG. 10 is a block diagram conceptually illustrating example components of a server according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (902/1002), processor(s) (904/1004), memory (906/1006), and/or storage (908/1008) of the device(s) 110 system(s) 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 11:
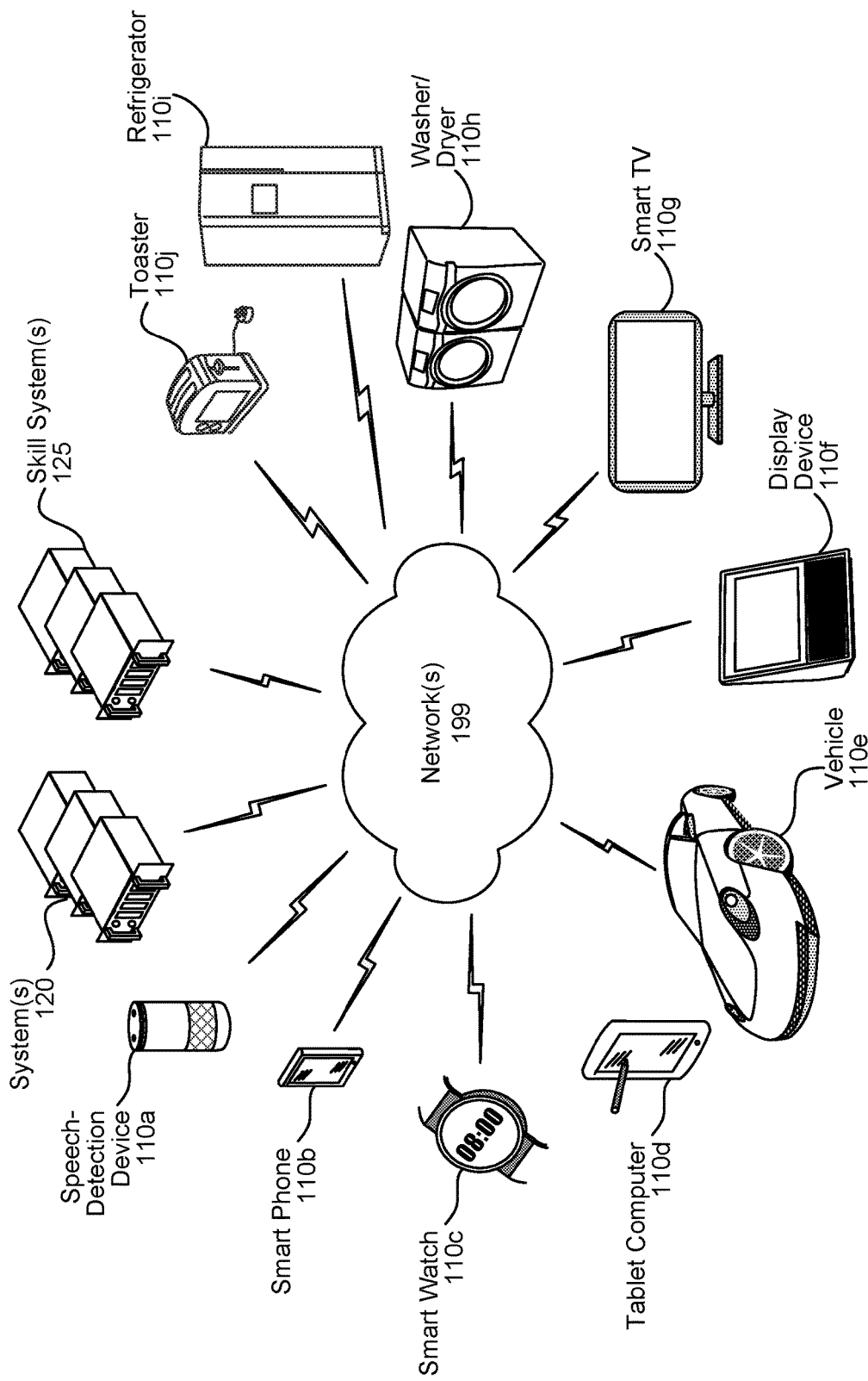
FIG. 11 illustrates an example of a computer network for use with the speech processing system.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, from a first device, first audio data representing a first utterance;
    processing the first audio data using an automatic speech recognition (ASR) machine-learning model to determine ASR data comprising a first ASR hypothesis, a first score corresponding to the first ASR hypothesis, a second ASR hypothesis, and a second score corresponding to the second ASR hypothesis;
    determining, based on the first score and the second score being below a threshold, an indication of uncertainty with respect to the processing of the first audio data;
    determining that the indication of uncertainty relates to a first entity represented by the first ASR hypothesis and a second entity represented by the second ASR hypothesis;
    generating output audio data requesting selection of the first entity or the second entity;
    sending the output audio data to the first device;
    receiving, from the first device in response to requesting selection of the first entity or the second entity, second audio data representing a second utterance;
    performing speech processing on the second audio data to determine a selection of the first entity;
    storing dialog session data comprising the first audio data, the indication of uncertainty, and the second audio data;
    determining, using the dialog session data, that the indication of uncertainty relates to a user profile corresponding to the first device;
    processing the dialog session data, the first audio data, and the second audio data to generate a user-specific ASR machine-learning model corresponding to the user profile; and
    associating the user-specific ASR machine learning model with the user profile.

2. The computer-implemented method of claim 1, further comprising:
    receiving third audio data representing a third utterance;
    determining that the third audio data corresponds to the user profile;
    determining the user-specific ASR machine learning model corresponds to the user profile;
    processing the third audio data using the ASR machine-learning model and the user-specific ASR machine learning model to determine a third ASR hypothesis and a third score, the third ASR hypothesis representing the first entity; and
    generating output data using the third ASR hypothesis based at least in part on the third score satisfying a threshold.

3. The computer-implemented method of claim 1, further comprising:
    receiving, from the first device, third audio data representing a third utterance;
    processing the third audio data using the ASR machine-learning model to determine a third ASR hypothesis and a third score, the third ASR hypothesis corresponding to a third entity;
    determining a second indication of uncertainty based on the third score;
    generating second output audio data requesting input with respect to the third entity;
    sending the second output audio data to the first device;
    receiving, from the first device, fourth audio data in response to the second output audio data;
    storing second dialog session data comprising the third audio data, the second indication of uncertainty, and the fourth audio data;
    determining that the second indication of uncertainty corresponds to a number of user profiles;
    determining that the number of user profiles satisfies a condition; and
    processing the second dialog session data and model data associated with the ASR machine-learning model to determine a second ASR machine-learning model.

4. The computer-implemented method of claim 1, further comprising:
    determining second dialog session data corresponding to a second user profile;
    determining that the second dialog session data includes the indication of uncertainty relating to the first entity and the second entity;
    determining a first location associated with the user profile;
    determining a second location associated with the second user profile;
    determining that the first location and the second location correspond to a geographic region;
    associating the user-specific ASR machine learning model with the geographic region;
    receiving third audio data representing a third utterance;
    determining that the third audio data corresponds to a third user profile;
    determining a third location associated with the third user profile;
    determining that the third location corresponds to the geographic region;
    determining that the user-specific ASR machine learning model is associated with the geographic region; and
    processing the third audio data using the user-specific ASR machine learning model.

5. A computer-implemented method comprising:
    receiving first data representing a first utterance;
    determining an indication of ambiguity corresponding to the first data;
    determining that the indication of ambiguity relates to second data represented in the first data, the second data representing an entity identified in the first data;
    generating output audio data requesting input corresponding to the second data;
    receiving, in response to requesting the input corresponding to the second data, input audio data representing a second utterance corresponding to the second data;
    storing dialog data;

associating the first data, the indication of ambiguity, and third data corresponding to the input audio data with the dialog data;

determining, using the dialog data, that the indication of ambiguity relates to a user profile; and processing the dialog data, the first data, and the third data to generate a user-specific machine-learning model corresponding to the user profile.

6. The computer-implemented method of claim 5, further comprising:

determining confidence data corresponding to the input audio data;

determining that the confidence data is below a threshold;

processing the third data to determine a portion of the third data that represents to the entity; and associating the portion of the third data with the dialog data.

7. The computer-implemented method of claim 5, further comprising:

determining confidence data corresponding to the input audio data; and determining that the confidence data is above a threshold, wherein processing the dialog data to determine the user-specific machine-learning model comprises processing, in response to the confidence data being above the threshold, the dialog data to determine the user-specific machine-learning model.

8. The computer-implemented method of claim 5, further comprising:

determining second dialog data corresponding to a second user profile;

determining that the second dialog data is associated with the indication of ambiguity;

determining a first location associated with the user profile;

determining a second location associated with the second user profile; determining that the first location and the second location correspond to a geographic region; and associating the user-specific machine learning model with the geographic region.

9. The computer-implemented method of claim 5, further comprising:

receiving second input audio data representing a third utterance;

determining that the second input audio data corresponds to the user profile;

determining the user-specific machine learning model corresponds to the user profile;

processing the second input audio data using the user-specific machine-learning model and an automatic speech recognition (ASR) model to determine fourth data and confidence data, the fourth data including a representation of the entity; and generating output data using the fourth data based at least in part on the confidence data satisfying a threshold.

10. The computer-implemented method of claim 5, further comprising:

receiving fourth data representing a third utterance;

receiving confidence data corresponding to the fourth data;

determining, using the confidence data, a second indication of ambiguity corresponding to the fourth data;

receiving second input audio data corresponding to the second indication of ambiguity;

storing second dialog data;

associating the fourth data, the second indication of ambiguity, and fifth data corresponding to the second input audio data with the dialog data;

determining that the second indication of ambiguity corresponds to a number of user profiles;

determining that the number of user profiles satisfies a condition;

determining an ASR machine-learning model used to determine the fourth data representing the third utterance; and processing the second dialog data and model data corresponding to the ASR machine-learning model to determine a second ASR machine-learning model.

11. The computer-implemented method of claim 5, further comprising:

determining a first entity and a second entity corresponding to the second data, wherein generating the output audio data requesting the input corresponding to the second data comprises generating output audio data requesting selection of the first entity or the second entity, and wherein receiving the input audio data comprises receiving the input audio data indicating selection of the first entity.

12. The computer-implemented method of claim 5, further comprising:

processing the input audio data to determine text data;

determining an entity represented in the text data; and generating output data using at least in part the entity, the output data corresponding to the first utterance.

13. A system comprising:

at least one processor; and at least one memory including instructions that, when executed by the at least one processor, cause the system to:

receive first data representing a first utterance;

determine an indication of ambiguity corresponding to the first data;

determine that the indication of ambiguity relates to second data represented in the first data, the second data representing an entity identified in the first data;

generate output audio data requesting input corresponding to the second data;

receive, in response to requesting the input corresponding to the second data, input audio data representing a second utterance corresponding to the second data;

store dialog data;

associate the first data, the indication of ambiguity, and third data corresponding to the input audio data with the dialog data;

determine, using the dialog data, that the indication of ambiguity relates to a user profile; and process the dialog data, the first data, and the third data to generate a user-specific machine-learning model corresponding to the user profile.

14. The system of claim 13, wherein the instructions that, when executed by the at least one processor, further cause the system to:

determine confidence data corresponding to the input audio data;

determine that the confidence data is below a threshold;

process the third data to determine a portion of the third data that represents the entity; and associate the portion of the third data with the dialog data.

15. The system of claim 13, wherein the instructions that, when executed by the at least one processor, cause the system to receive the data further causes the system to:

determine confidence data corresponding to the input audio data; and determine that the confidence data is above a threshold, wherein the instructions to process the dialog data to determine the user-specific machine-learning model causes the system to process, in response to the confidence data being above the threshold, the dialog data to determine the user-specific machine-learning model.

16. The system of claim 13, wherein the instructions that, when executed by the at least one processor, cause the system to receive the data further causes the system to:

determine second dialog data corresponding to a second user profile;

determine that the second dialog data is associated with the indication of ambiguity;

determine a first location associated with the user profile;

determine a second location associated with the second user profile;

determine that the first location and the second location correspond to a geographic region; and associate the user-specific machine learning model with the geographic region.

17. The system of claim 13, wherein the instructions that, when executed by the at least one processor, further cause the system to:

receive second input audio data representing a third utterance;

determine that the second input audio data corresponds to the user profile;

determine the user-specific machine learning model corresponds to the user profile;

process the second input audio data using the user-specific machine-learning model and an automatic speech recognition (ASR) model to determine fourth data and confidence data, the fourth data including a representation of the entity; and generate output data using the fourth data based at least in part on the confidence data satisfying a threshold.

18. The system of claim 13, wherein the instructions that, when executed by the at least one processor, further cause the system to:

receive fourth data representing a third utterance;

receive confidence data corresponding to the fourth data;

determine, using the confidence data, a second indication of ambiguity corresponding to the fourth data;

receive second input audio data corresponding to the second indication of ambiguity;

store second dialog data;

associate the fourth data, the second indication of ambiguity and fifth data corresponding to the second input audio data with the dialog data;

determine that the second indication of ambiguity corresponds to a number of user profiles;

determine that the number of user profiles satisfies a condition;

determine an ASR machine-learning model used to determine the fourth data representing the third utterance; and process the second dialog data and model data corresponding to the ASR machine-learning model to determine a second ASR machine-learning model.

19. The system of claim 13, wherein the instructions that, when executed by the at least one processor, further cause the system to:

determine a first entity and a second entity corresponding to the second data, wherein the instructions to generate the output audio data requesting the input corresponding to the second data causes the system to generate output audio data requesting selection of the first entity or the second entity, and wherein the instructions to receive the input audio data causes the system to receive the input audio data indicating selection of the first entity.

20. The system of claim 13, wherein the instructions that, when executed by the at least one processor, further cause the system to:

process the input audio data to determine text data;

determine an entity represented in the text data; and generate output data using at least in part the entity, the output data corresponding to the first utterance.

* * * * *